United States Patent [19]
Kemker et al.

[11] Patent Number: 5,794,524
[45] Date of Patent: Aug. 18, 1998

[54] FOOD PROCESSOR WITH A MIXING VESSEL AND A DRIVE MECHANISM FOR AN AGITATOR IN THE MIXING VESSEL

[75] Inventors: Uwe Kemker, Wuppertal; Stefan Dörner, Solingen; Oliver Lapp, Wuppertal, all of Germany

[73] Assignee: Vorwerk & Co. Interholding GmbH, Wuppertal, Germany

[21] Appl. No.: 737,766
[22] PCT Filed: Apr. 28, 1995
[86] PCT No.: PCT/EP95/01636
§ 371 Date: Jan. 7, 1997
§ 102(e) Date: Jan. 7, 1997
[87] PCT Pub. No.: WO95/29615
PCT Pub. Date: Nov. 9, 1995

[30] Foreign Application Priority Data
Apr. 28, 1994 [DE] Germany .......... 44 14 823.2

[51] Int. Cl.[6] .................................................. A47J 27/04
[52] U.S. Cl. .................. 99/348; 99/413; 99/410; 126/369; 426/312
[58] Field of Search .............. 99/348, 410, 413, 99/412; 126/369; 426/312, 523

[56] References Cited

U.S. PATENT DOCUMENTS

| 2,097,478 | 11/1937 | Struble . | |
|---|---|---|---|
| 5,275,094 | 1/1994 | Naft | 99/476 |

FOREIGN PATENT DOCUMENTS

| 460483 | 11/1945 | Belgium . |
|---|---|---|
| 2326171 | 4/1977 | France . |
| 3507276 | 9/1986 | Germany . |
| 8709400 | 8/1988 | Germany . |

Primary Examiner—Reginald L. Alexander
Attorney, Agent, or Firm—Martin A. Farber

[57] ABSTRACT

The invention relates to a food processor with a mixing vessel and a drive mechanism for an agitator in the mixing vessel, the lower region of which can be heated. As a simple way of improving a food processor of this type, it is proposed that a top unit for the mixing vessel should have a perforated base to allow food to be steam-cooked. The perforations are formed in a support plate in the base of the top unit and condensation and moisture are led back into the mixing vessel.

26 Claims, 17 Drawing Sheets

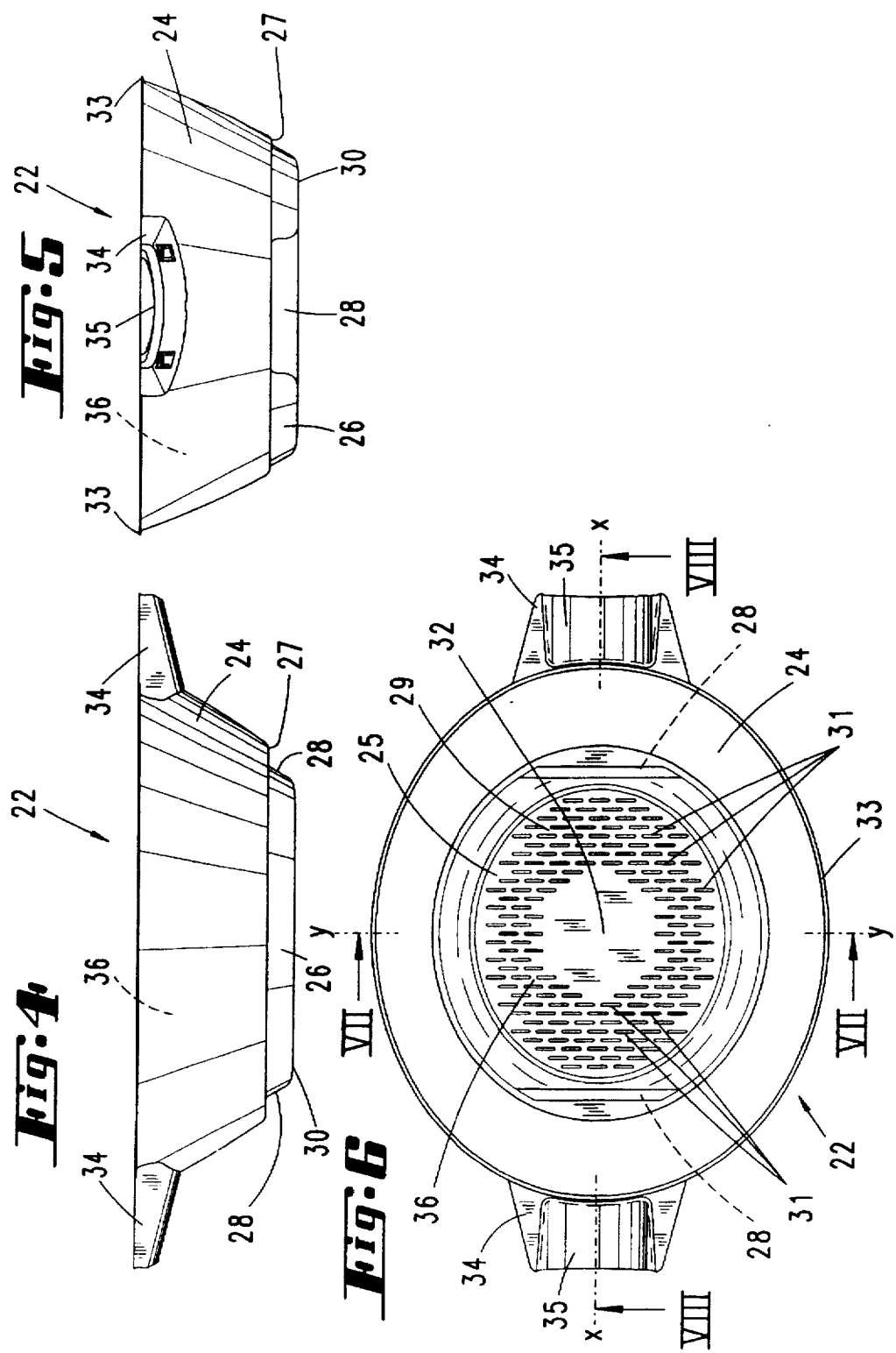

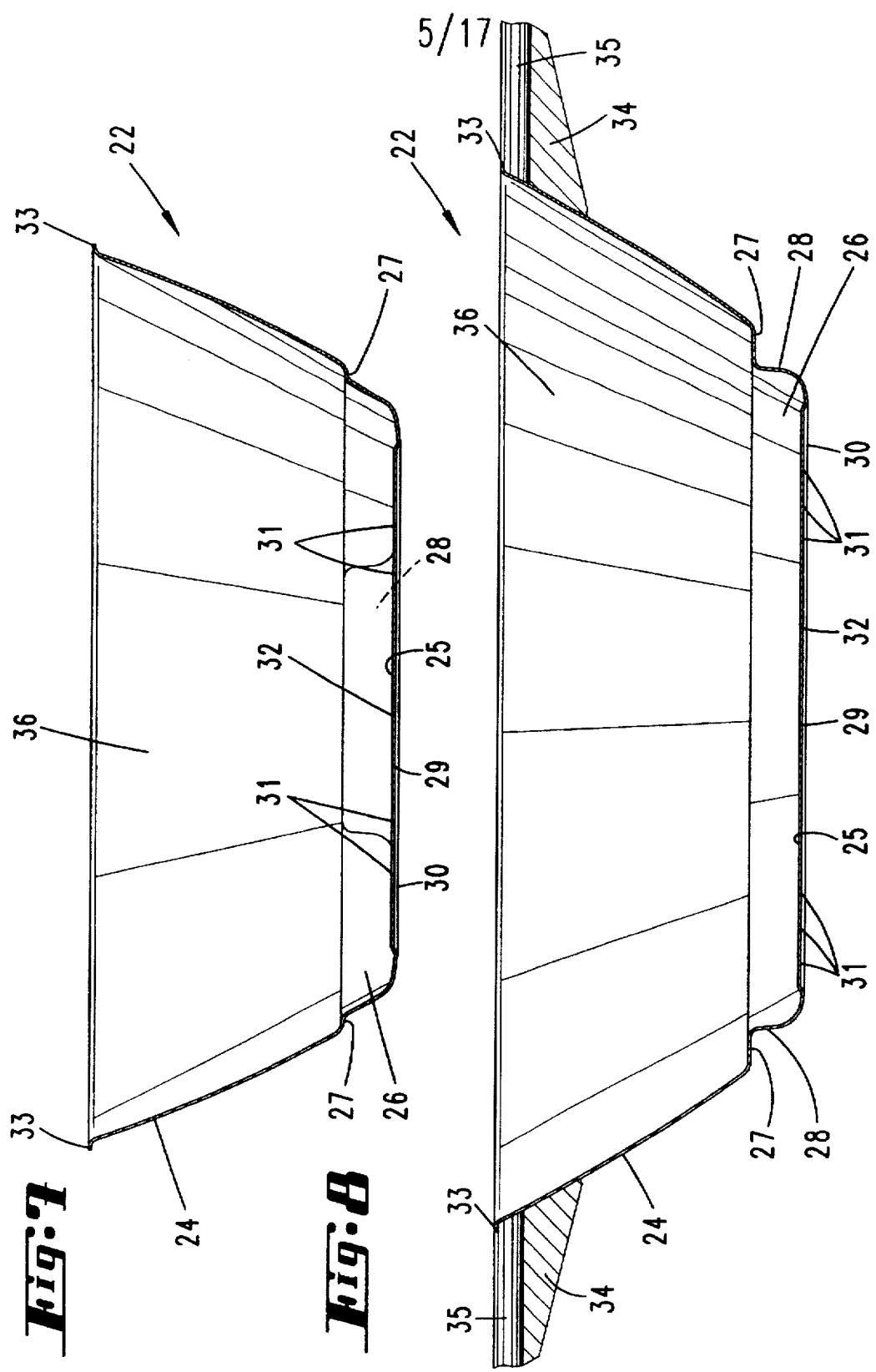

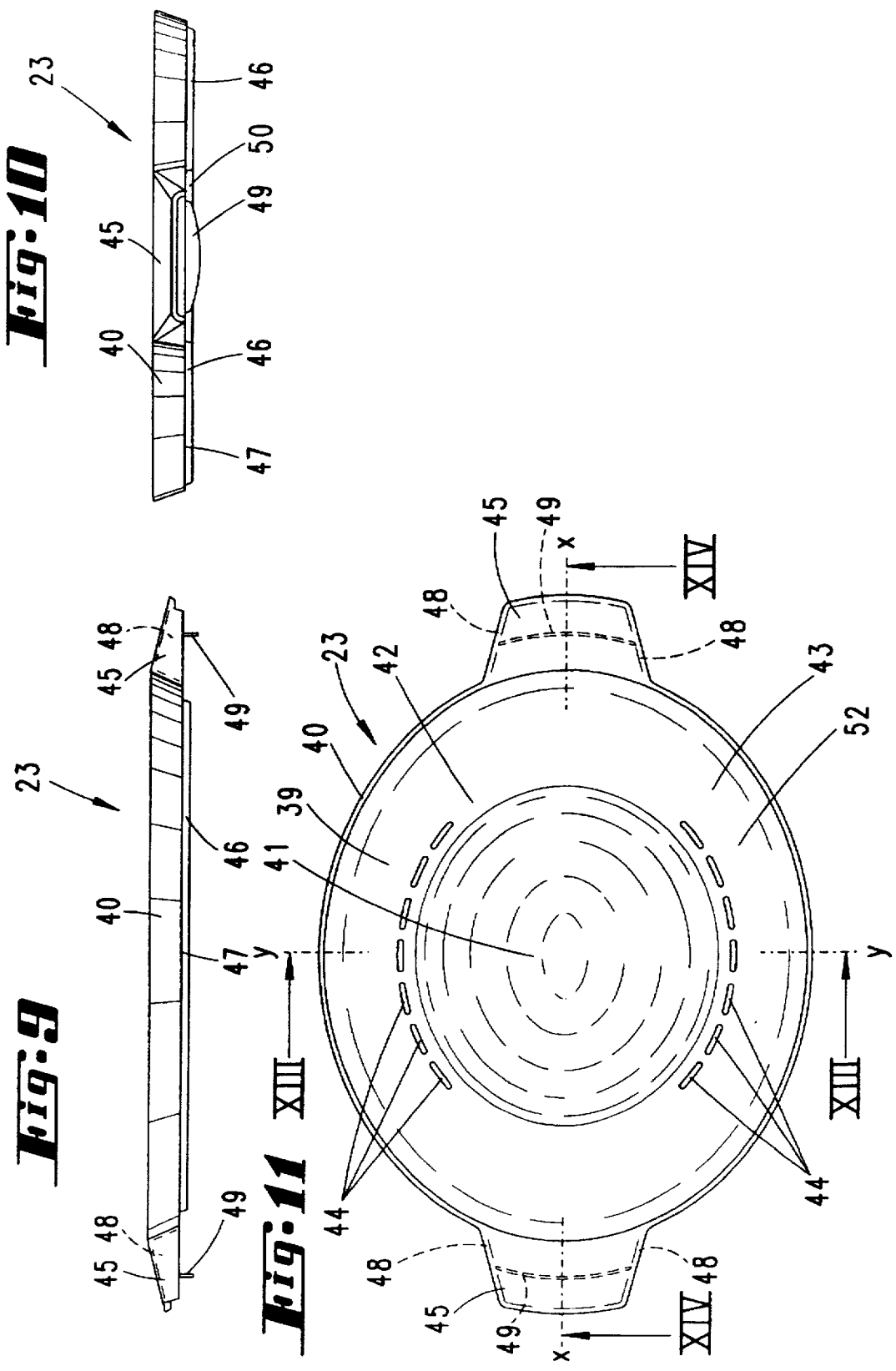

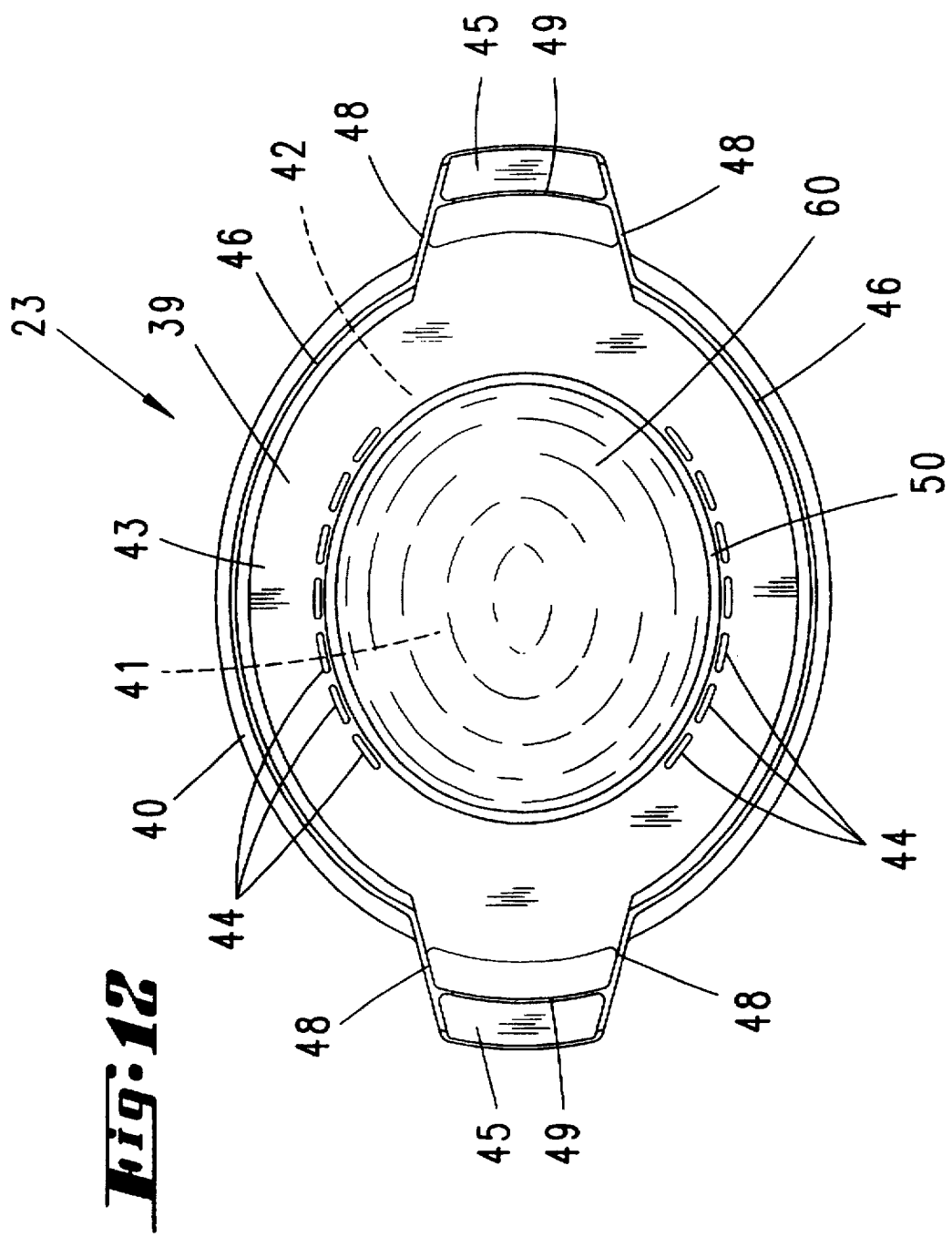

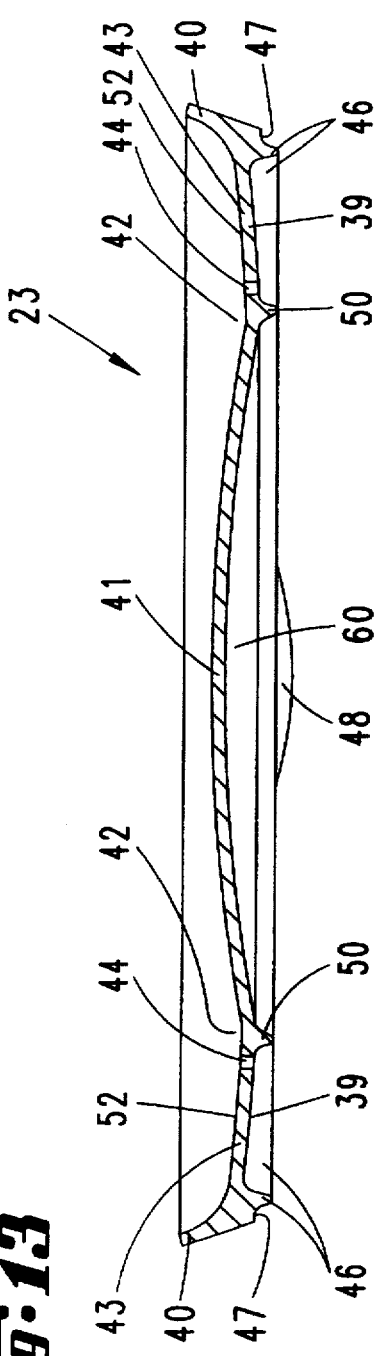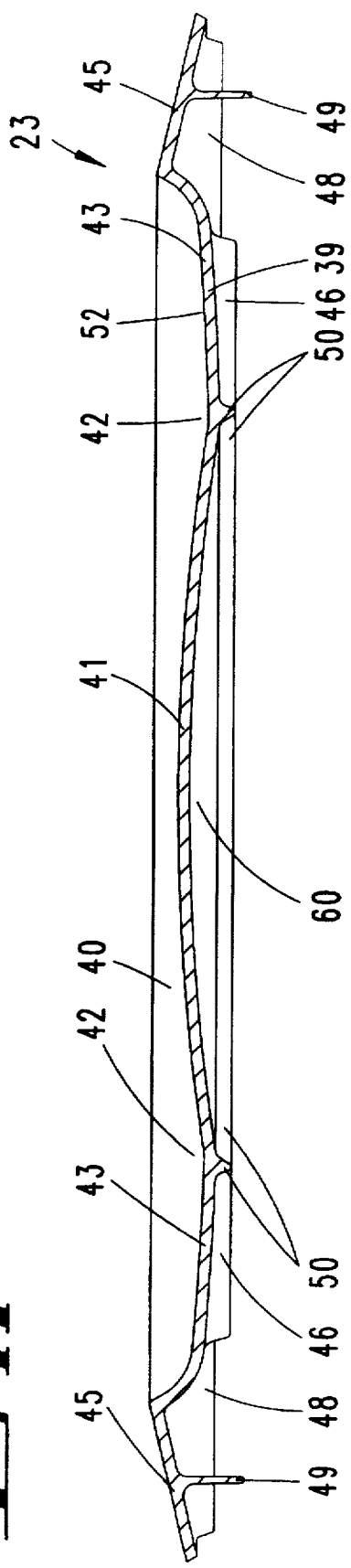

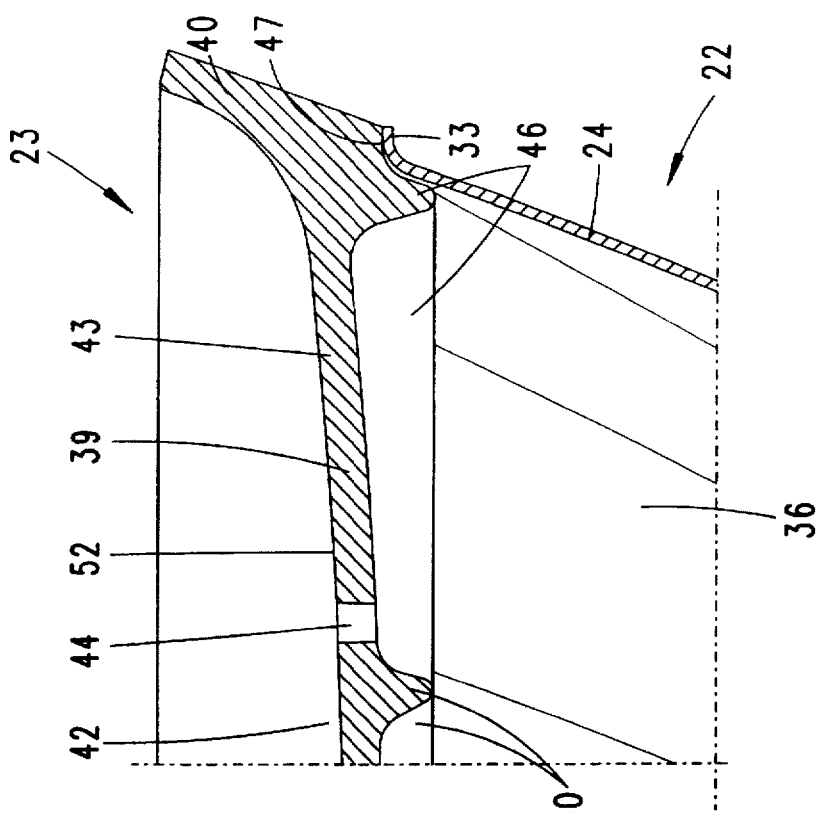
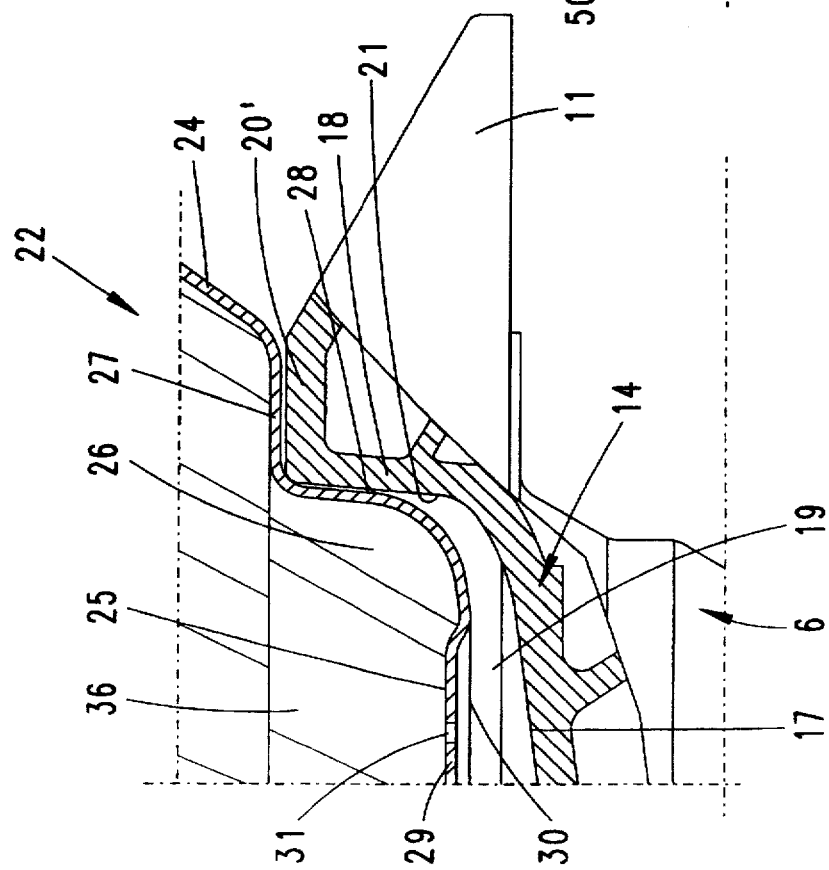

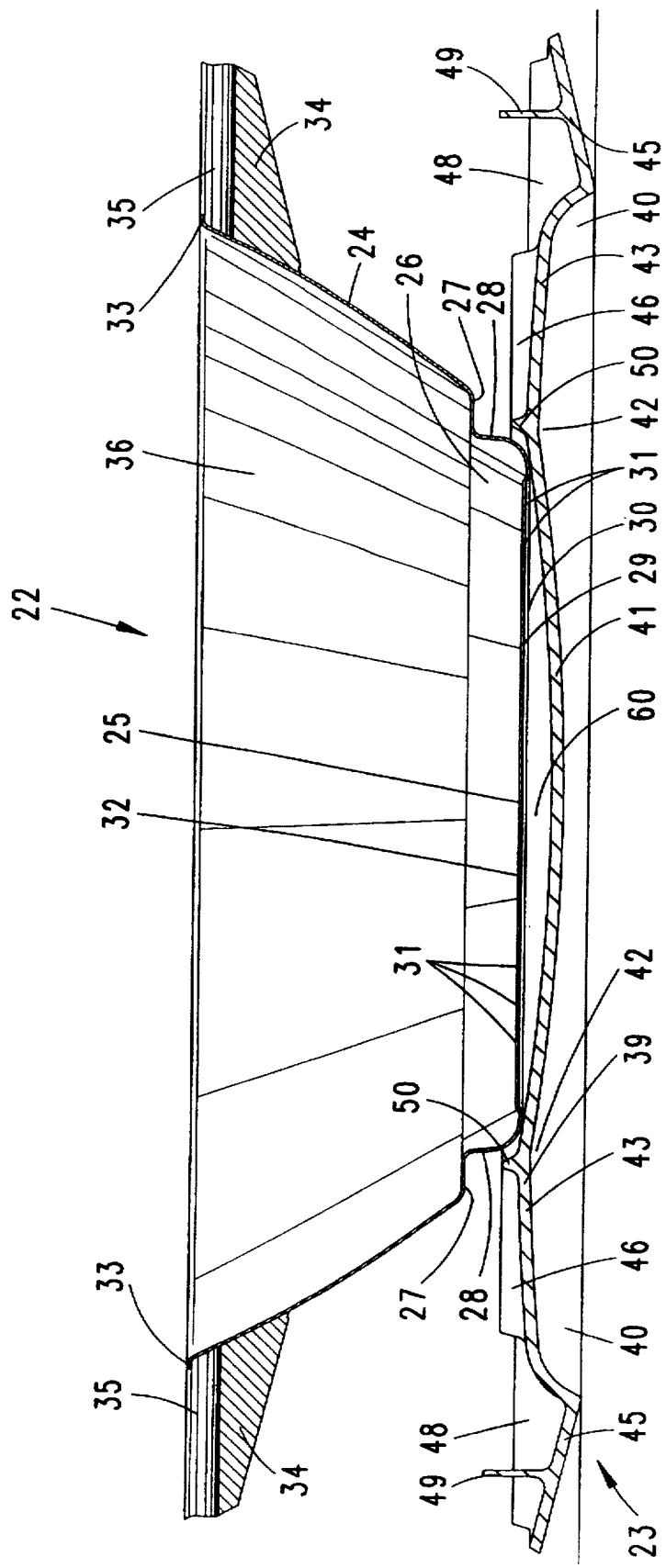

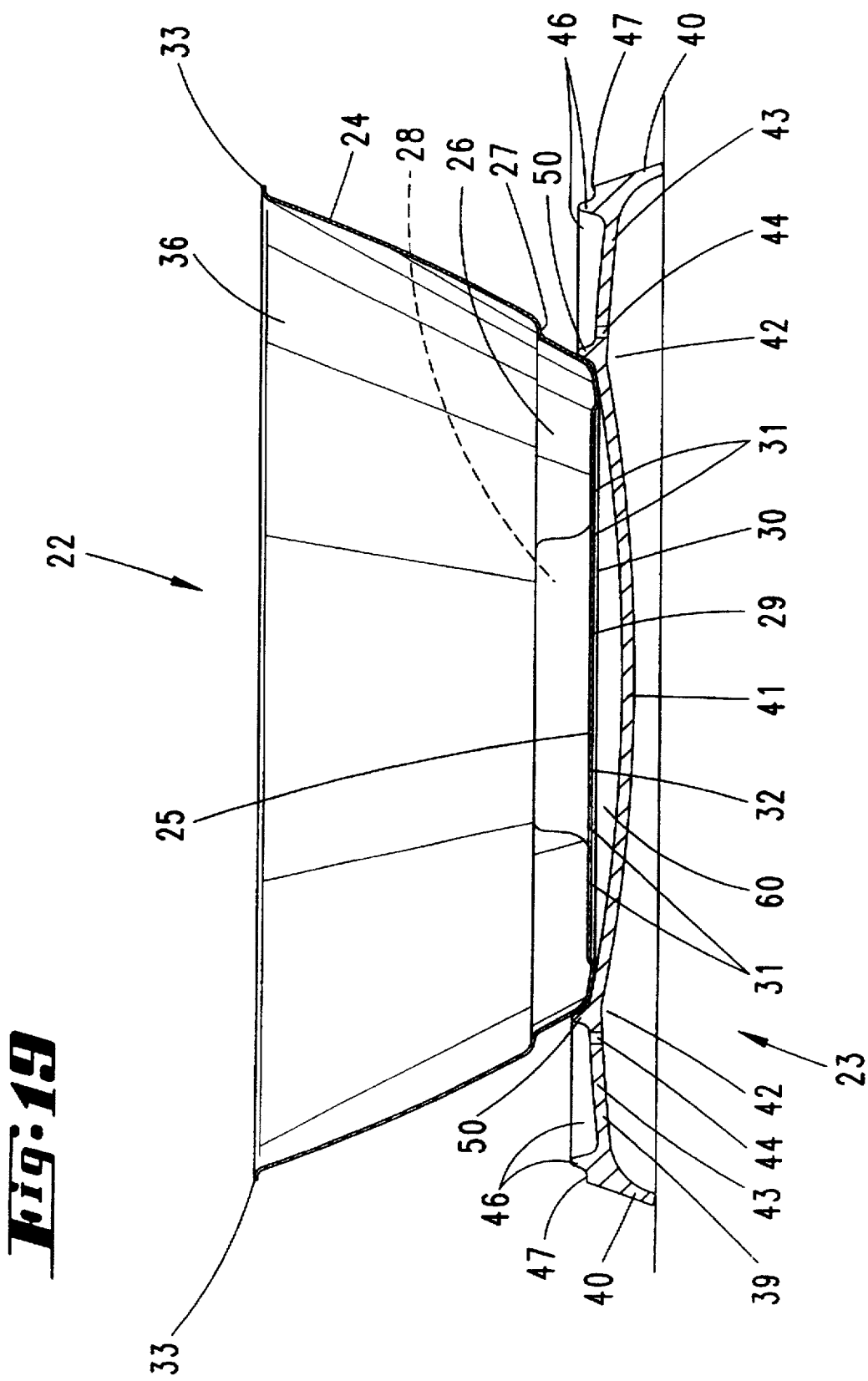

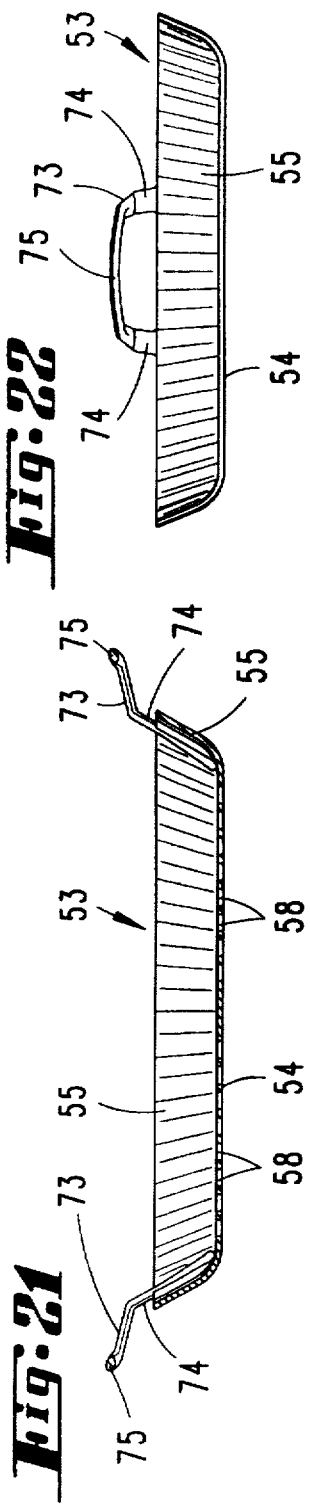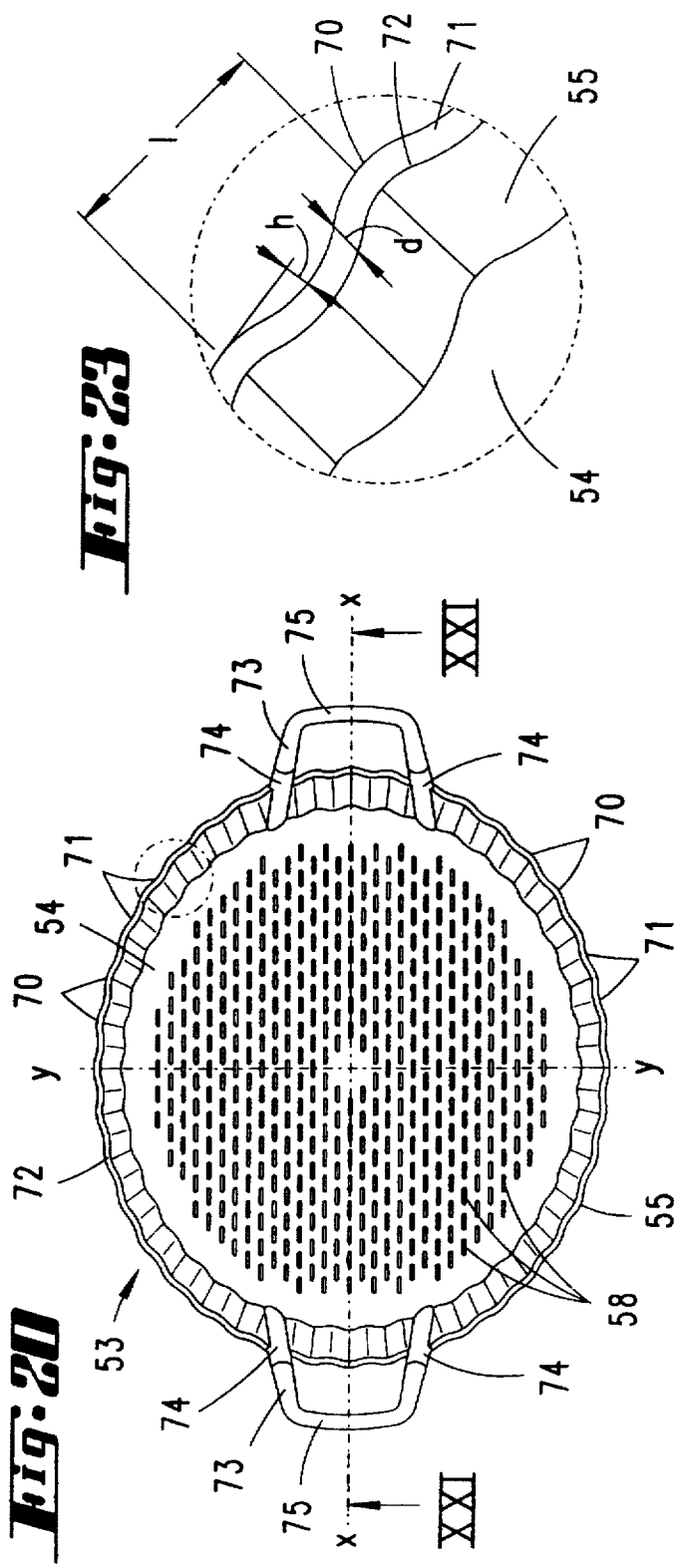

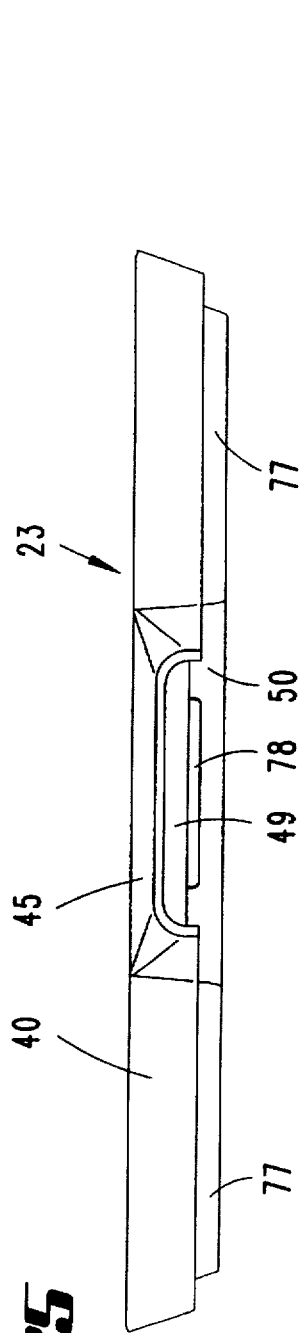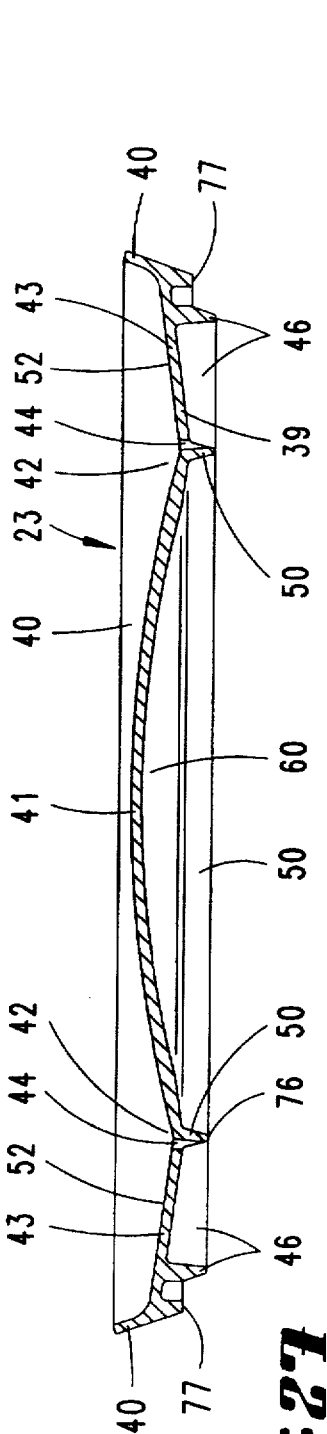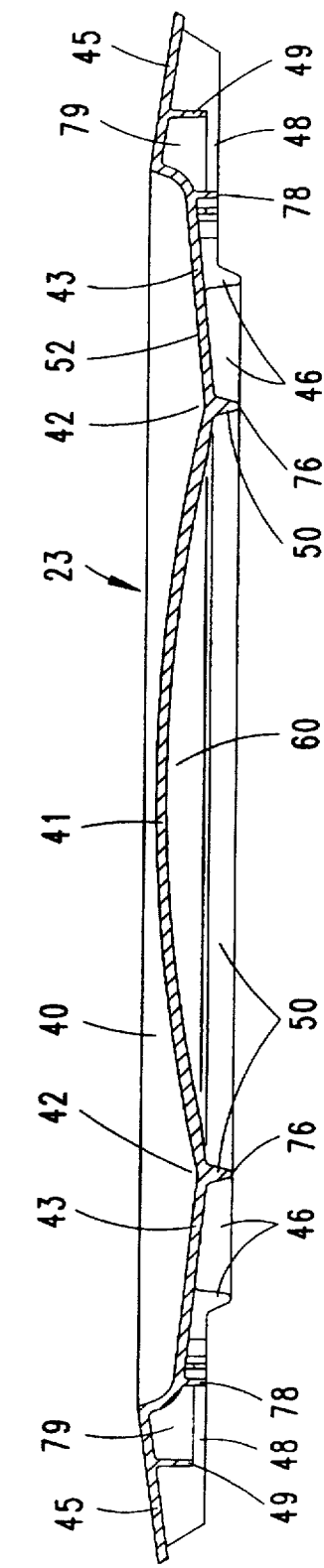

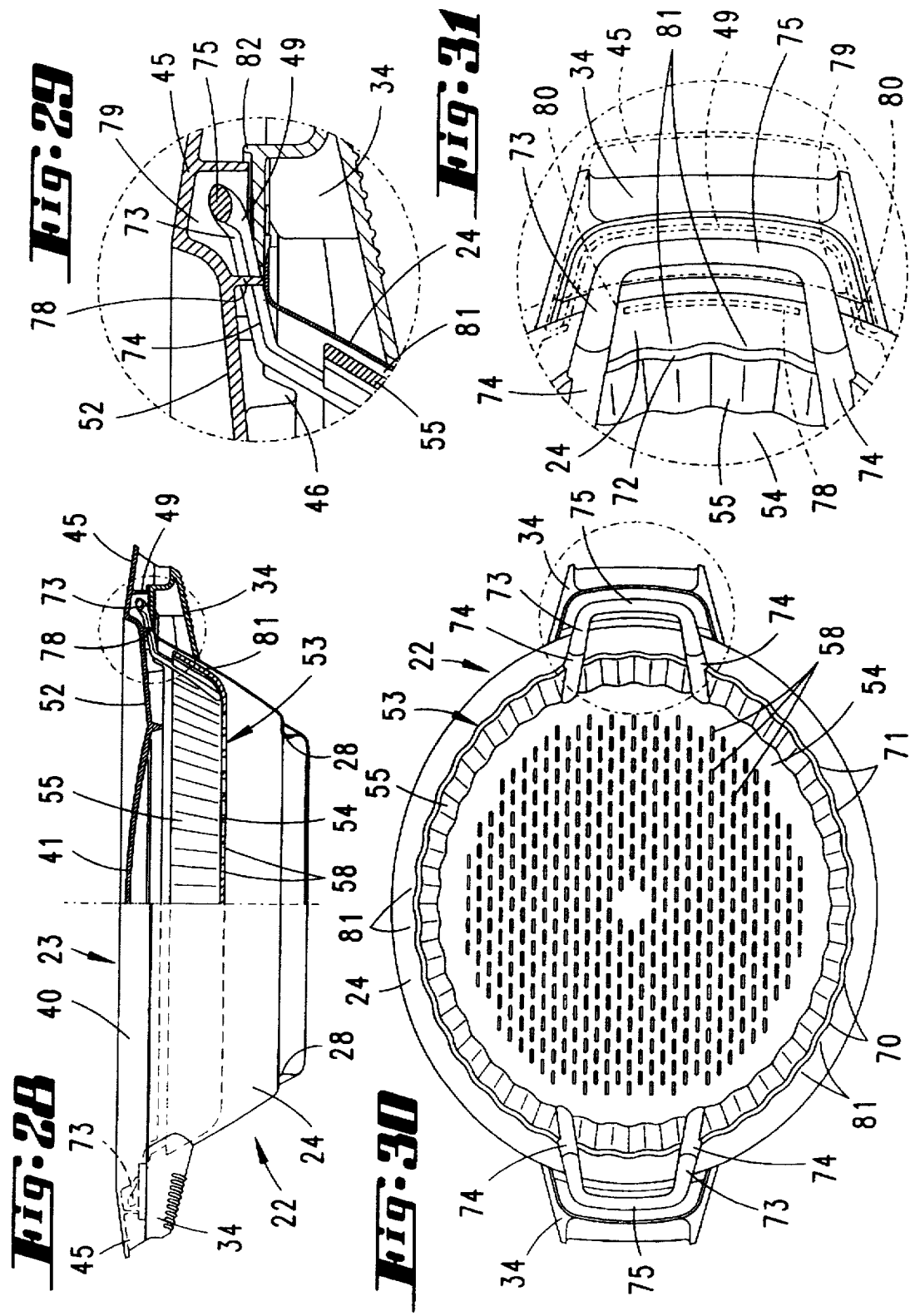

FOOD PROCESSOR WITH A MIXING VESSEL AND A DRIVE MECHANISM FOR AN AGITATOR IN THE MIXING VESSEL

FIELD AND BACKGROUND OF THE INVENTION

The invention relates to a food processor comprising a mixing vessel and a drive mechanism for an agitator in the mixing vessel, the mixing vessel being heatable in its lower region.

There are food processors known which have a drive mechanism for an agitator in a mixing vessel. Food processors of this kind serve, for example, for the production of doughs or the like, for example for the production of farinaceous products. The ingredients introduced into the mixing vessel are mixed by means of the driven agitator. Depending on the construction of the agitator, the introduced ingredients may also be kneaded, for example into a dough or the like. It is further known, for example from DE-OS 3507276, to equip food processors of this kind with a heater. The heater acts preferably in the lower region of the mixing vessel, which is heatable in this way. Food processors constructed in this manner can be used, for example, for the production of soups, sauces or the like. During the heating phase, the soup or sauce located in the mixing vessel is now stirred, which leads to an optimum blending and to an improved flavouring of the food.

SUMMARY OF THE INVENTION

It is an object of the present invention to improve a food processor of this type in a simple way.

As a result the arrangement of the present invention, there is provided a food processor which, apart from the functions mentioned, such as stirring and heating, further presents the possibility of a cooking of foodstuffs. This is achieved in that a top unit for the mixing vessel has a perforated base for the preparation by steaming of foodstuffs, the perforations being formed in a food material support of the top unit base and condensate/moisture forming being conducted back into the mixing vessel. By a heating of a stock located in the mixing vessel, there are released flavoured vapours. This effect is further intensified when the agitator in the mixing vessel is switched on. The flavoured vapours may, on account of the arrangement mentioned, pass through the perforations of the top unit base and after this, swirl around the foodstuff to be steamed, which is located in the top unit. The aforementioned foodstuff or the cooking material absorbs in this way flavours of the vapour. The condensate forming during the steaming in the top unit can be conducted, in turn, through the perforations provided in the top unit base, back into the mixing vessel. It is advantageous above all in this connection for the moisture forming during a steaming, in particular the emerging foodstuff moisture forming, to be conducted back likewise into the mixing vessel over the aforementioned route. The stock located in the mixing vessel is therefore enriched in turn with flavours of the cooking material. The switched-on agitator effects an optimum blending of the moisture or condensate conducted back. A food processor formed in this manner is especially advantageously to be used whenever, for example, sauces or the like are to be refined with spice flavours, without the sauce or the like entering directly into contact with the spices.

For this purpose, the spices may be located in the top unit, the flavours condensing out of the spices by virtue of the steaming. This condensate drips, as a consequence, through the perforations of the top unit base, back into the mixing vessel. The sauce there present is refined with the desired flavours. The constantly rotating agitator effects a uniform distribution of the flavours. In an advantageous development of the subject matter of the invention, it is provided that the top unit base has a central, unperforated region. Because of this arrangement, there is formed a surface which permits also, for example, fine-grained spices or the like to be introduced into the top unit. The openings of the top unit base are so dimensioned that usual foodstuff or large-surfaced spices may not fall through these openings into the mixing vessel, but are rather made so large that even viscous condensate or viscous moisture forming may be conducted back. Fine-grained spices such as, for example, salt, pepper or the like could, however, fall through these perforations into the mixing vessel. These spices may, because of the aforementioned arrangement, be disposed in the unperforated region of the top unit base. Also in this region, the spices/foodstuff are washed around by the rising vapours. As already mentioned, the unperforated region is preferably located centrally in the top unit base, which leads here also to an optimum washing around of the spices or foodstuff placed there. The top unit can furthermore be formed, for example, to be pot-like. It is conceivable, in this connection, to form the top unit to be frusto-conical in shape, with the top unit widening upwardly. It is furthermore conceivable to form such a pot-like top unit to be oval in respect of its base surface and to provide it with handles, the latter preferably being arranged in extension of the longitudinal axis of the oval top unit.

In a preferred embodiment, the ovally formed top unit has an aspect ratio of longitudinal axis to transverse axis of approximately 1.2:1 to 1.5:1. A top unit formed in such a way is held open upwardly for filling and may, by means of the handles, be placed on or lifted off a mixing vessel as described at the beginning. In a preferred arrangement, it is furthermore provided that there is located, between the top unit and the mixing vessel, an inserted cover which has a substantially central large opening. This intermediate cover is advantageously adapted to the contour of the mixing vessel and located on the latter. On this cover, there is placed the top unit. The condensate forming or the moisture forming during the steaming operation is, as already mentioned, conducted back through the perforations in the top unit base. After passage through the perforations of the top unit base, the condensate or the moisture forming reaches the surface of the inserted cover. This inserted cover is preferably provided with a descending slope directed towards the large opening, by virtue of which the moisture draining off outside the region of the large opening is conducted to the large opening. From here, the moisture passes into the mixing vessel. The central arrangement of the large opening of the inserted cover effects, furthermore, a central return of the condensate or the moisture forming in the direction of the likewise centrally located agitator. The central large opening is, in a projection, associated with the central, unperforated region of the top unit base, by which there is produced the advantageous effect that the vapour rising out of the mixing vessel first substantially impinges on the unperforated region and is conducted from there to the edge of the top unit. With an interposition of an inserted cover, provided with a central large opening, between the mixing vessel and the top unit, the central, unperforated region of the top unit has a favourable effect, because otherwise the centrally rising vapour would impact on the cooking material located directly above.

This would have the result that the cooking material in the central region would be cooked earlier than that located in the edge zones. It is also advantageous in this arrangement that after removal of the top unit, the mixing vessel and especially the agitator are not immediately exposed. To obtain an improved effect during the cooking operation, it is proposed that the top unit be covered with a cover, the cover having openings, and a supporting surface for cooking material being provided. The cover thus covers the cooking space, by virtue of which the flavoured vapours entering the top unit and suffusing the cooking space cannot escape in uncontrolled manner. There is thus provided an optimum washing around of the foodstuff or the like placed in the top unit. In order, however, to counteract an increased overpressure, the cover has openings through which vapours may emerge. These openings are, however, so dimensioned in size and number that only a portion of the flavoured vapours entering into the top unit can pass through the cover openings. By comparison with the top unit base, which, but for the aforementioned central, unperforated region, is provided over almost its entire surface with perforations, the cover is provided only with a few perforations arranged in line. Preferred in this connection is an arrangement of two rows of perforations lying opposite one another. In addition, these perforations can further be used to wash around, with flavoured vapours, the cooking material located on the supporting surface of the cover. There is in this way provided a layer-type arrangement of supporting surfaces for foodstuff to be steamed.

Also, as in the top unit already described before, in the case of foodstuffs lying on the cover, condensate or moisture forming can be conducted back through the perforations in the top unit and from there into the mixing vessel. This arrangement is especially advantageous whenever different types of foodstuff are to be steamed by the same stock, without the foodstuffs being able to come into contact with one another. Furthermore, the cover can be provided on its underside, i.e. on the side facing the top unit, with a, for example, annular drip projection. This projection directed downwardly effects a draining of the condensate collecting on the underside of the cover back into the top unit. The outer contour of the cover corresponds, preferably, to that of the top unit. Furthermore, it is proposed to provide the cover, likewise, with handles, which, with cover placed on the top unit, lie in coincidence with the handles of the top unit. Advantageously, the cover can also serve as stand for the top unit, for example for putting down the top unit on a work surface. The top unit has here, in its lower region facing the top unit base, an outer contour corresponding to the inner contour of the drip projection of the cover. If the cover is used as stand, it is placed with its originally upper side downwards onto the support area or the like, by virtue of which the aforesaid annular drip projection points upwardly. The top unit is now placed on the cover in such a way that the outer contour of the base region of the top unit is encompassed by the annular drip projection. Any liquid still emerging from the top unit through the openings of the top unit base is thus collected within the region defined by the annular drip projection.

It is furthermore provided that the cover has an inner, upwardly-arched central base region. In cooking operation, this dome-like central base region effects a directed run-off of condensate or moisture forming on the surface of the cover into the outer edge regions. When using the cover as stand, this arrangement effects an enlargement of the seat volume in the region of the annular drip projection, with top unit placed on this cover. The base surface of the upwardly-arched central base region is identical in contour to the substantially outer contour of the cover. This means with, as described before, an oval arrangement of the top unit and of the cover, a correspondingly oval base surface of the central base region. Advantageously, the openings are associated with a foot region of the central base region. The moisture draining off from the raised central base region passes by a direct route through the openings into the top unit. The collecting and leading back of condensate or moisture arising from cooking material located on the supporting surface of the cover is optimised in that the cover edge has, circumferentially extending from the foot region, an ascending portion, which passes into a raised circumferential edge. This circumferential edge closes off the supporting surface, by virtue of which, on the one hand, there is provided a reliable collecting of the condensate or the moisture forming and, on the other hand, the cooking material lying on the supporting surface is secured against falling off. The ascending portion extending from the foot region effects a flow of the condensate or the moisture forming away from the circumferential edge, towards the openings, which, as already mentioned, are provided in the foot region of the raised central base region. There is thus formed a channel, in which there are provided the openings.

When there is associated with such a pan-type cover, on its underside, the previously mentioned annular drip projection, the latter is so dimensioned that the openings of the cover are positioned outside of the annular enclosed region of the drip projection. It proves especially advantageous for the cover to have, on the underside, a circumferential sealing projection, for sealing cooperation with an edge of the top unit. By this means, there is prevented an uncontrolled emergence of the flavoured vapours. The latter, on the contrary, swirl through the cooking space of the top unit closed off by the cover provided with the circumferential sealing projection. The vapours may only escape directed through the perforations provided in the cover, on the one hand to prevent too high an over-pressure in the cooking space and on the other hand to steam the cooking material provided on the supporting surface of the cover. Preferred in this connection is an arrangement of the cover in which the cover has an almost identical outer contour to the top unit. The circumferential sealing projection is located on the underside of the cover, along its edge, at a distance from the edge. The cover is placed on the top unit in such a way that the edge projecting beyond the sealing projection is supported on the edge of the top unit and the sealing projection engages on the inner side against the edge of the top unit. It is furthermore proposed, when using a top unit provided with handles and a cover likewise equipped with handles, to provide the circumferential sealing projection along the outer contour of the cover. This means that the sealing projection, extending from an edge region of the cover, extends through the region of the handles. This can be realized, for example, in the form of cross-members provided on the underside, which effect a sealing closure between the handles of the top unit and of the cover.

As already mentioned, the cover may be provided on its underside with a, for example, annular drip projection. This can be solved by the cover, on the underside, forming an inner drip edge spaced apart from the sealing projection, in the form of a circumferential rib. This rib is preferably located in a projection to the foot region of the central base region. Rising vapours can thus controlledly drip, after condensation, back into the top unit again. In an alternative embodiment, it is proposed that the openings of the cover are partially let into the contour of the rib. Because of this arrangement, it is guaranteed that condensate forming on the top unit cover may pass through the openings directly into the region of the drip edge, from which this condensate can drain off. The openings of the cover are, in advantageous manner, so positioned that the drip edge comb is unaffected even in the region of the openings. The drip edge can have, for this purpose, for example a trapezoidal cross-section, the openings of the cover penetrating a trapezoidal surface of the drip edge. Any penetrating condensate thus immediately passes into the region of the drip edge comb, from which there is effected a directed draining into the top unit. It is of further advantage for an intermediate tray to be located between the top unit and the cover. In this intermediate tray, there can be introduced other foodstuffs which are to be steamed. There is thus facilitated a cooking of foodstuffs in three layers. For this purpose, the base of the intermediate tray has corresponding perforations, which preferably are formed and arranged in like manner to those of the top unit base. This means that here also there may be provided a central, unperforated region.

In order, also on insertion of an intermediate tray of this kind, to guarantee an optimum sealing of the entire cooking space, it is provided that an edge of the intermediate tray is located within the circumferential sealing projection of the cover. The sealing of the cooking space and the cooperation of the circumferential sealing projection with an edge of the top unit is not reduced by the insertion of an intermediate tray. In an arrangement as previously described of top unit and cover with handles, the intermediate tray can likewise be provided with handles, by which the intermediate tray is supported on an upper side of the top unit handles. It works out especially advantageous in this connection for the circumferential sealing projection of the cover to extend also through the region of the handles. The sealing projection portions provided on the underside of the cover handles effect an optimum sealing in this region. The cover handles overlap the region of the intermediate tray handles, the sealing portions provided there being supported sealingly against the upper side of the top unit handles. In a further embodiment, it may be provided that the intermediate tray leaves through-flow openings with respect to the inner surface of the top unit. For this purpose, the intermediate tray may have, on the outer side in its wall region, projections by which the intermediate tray is supported on the inner surface of the top unit. Between these projections, there remain through-flow openings, by virtue of which it is guaranteed that rising vapours flow also past the outer sides into the upper portion of the top unit bounded by the intermediate tray and heat the foods located there. An arrangement is preferred in which the edge of the intermediate tray is formed wave-like in such a way that the wave crests and wave troughs extend substantially vertically. The intermediate tray is supported accordingly, in the region of the wave crests, on the inner surface of the top unit, by virtue of which the through-flow openings are left in the region of the wave troughs. Advantageously, the wave-like construction of the edge is provided over the entire circumference of the intermediate tray. Advantageously, the wave-like-formed edge of the intermediate tray is dimensioned in such a way that a wave height corresponds to approximately a wall thickness and a wavelength corresponds to approximately four to five times the wall thickness. As already mentioned, the cover can have, on its underside, a circumferential sealing projection. For this purpose, it is proposed in a further development that a partial portion of the sealing projection is formed as a sealing strip and that the cover has, offset inwardly and spaced apart from the sealing strip, a seat-space closing wall, which has openings for nesting of the handle of the intermediate tray. The sealing projection of the cover continues in the region of the cover handles in the form of sealing strips. To form a seat space in which there lies, in assembled condition, at least a portion of the intermediate tray handle, there is provided a seat-space closing wall spaced apart from the sealing strip and offset inwardly. The seat-space closing wall has openings for the passage of the intermediate tray handle. These openings are, in the assembled condition, almost completely closed by the handle cross-section of the intermediate tray. Because of this arrangement, the sealing of the cooking space from the outer sides is improved. Hot vapours pass only in small quantities into the seat-space formed between the sealing strip and the closing wall, by which it is guaranteed that the handles, in particular those of the cover, are not heated up too much.

To increase this effect further, it may be provided that the seal is formed labyrinth-like, in such a way that there is provided, on the handle of the top unit, a closing rib for outside disposition at the sealing strip. The cover, put on, is supported, in the region of the top unit handles, against the latter by means of the sealing strip. A further support is effected in the region of the seat-space closing walls. The sealing strips are covered on the outer side by a closing rib located on the upper side on the handle of the top unit, by virtue of which there is achieved a labyrinth-type sealing of the cooking space in the region of the handles. To offer the user an orientation aid when placing the top unit on the mixing vessel, it may be provided that the top unit defines register surfaces which cooperate with corresponding counter-register surfaces on the inserted cover. The register surfaces of the top unit are, in this connection, preferably located in the region of the top unit base and, for example, provided in the form of inward archings. These inward archings cooperate with corresponding outward archings, for example in the form of noses of the inserted cover. Besides the advantage of an orientation aid for the user, these register surfaces also provide a protection against rotation of the top unit on the inserted cover. Above all with, as already mentioned, an oval plan of the top unit, there may result, on vibration, a rotation of the top unit on the inserted cover, which at the same time, because of the oval construction, has as a consequence a slipping out and lifting of the top unit. This is successfully prevented by the aforementioned register surfaces, because the latter represent a protection against rotation. It here proves especially advantageous for a register surface to be formed step-like. Finally, it is provided in an advantageous development, that a register surface extends perpendicular to a main axis of the top unit.

In a mentioned oval arrangement of the top unit and a corresponding construction of the inserted cover, a register surface of the top unit extends perpendicular to the longer axis of the oval base surface. Advantageously, the counter-register surface on the inserted cover is likewise aligned correspondingly perpendicular to the longitudinal axis of the oval supporting surface of the inserted cover. To prevent an unintentional lifting of the top unit from the inserted cover, for example by children, it may be provided that the register surfaces on the top unit are formed as trough-like undercuts. These trough-like undercuts may cooperate with corresponding counter-register surfaces, where with top unit placed on the inserted cover, there is formed an under-handle which prevents a tipping of the top unit. For this purpose, it may be provided that at least one counter-register surface is formed as a nose-like register projection. Preferred in this connection is an arrangement in which the under-handle is formed opposite the mixing vessel handle, for which the inserted cover of the mixing vessel has an inwardly-directed nose and the top unit has a correspondingly formed trough.

The invention relates, in addition, to a method of preparing food in a device formed as food processor, which comprises an agitator accommodated in a mixing vessel and a heater to cook the food. In an advantageous arrangement, it is proposed that the vapours rising out of the mixing vessel are conducted into a top unit vessel, with flowing around of the cooking material accommodated in the top unit vessel, and are conducted, in the form of condensate, after further permeation of the cooking material, in reverse direction back into the mixing vessel. By a heating of a stock located in the mixing vessel, flavoured vapours are released. This effect is further intensified when the agitator located in the mixing vessel is switched on. The flavoured vapours rise up into the top unit and swirl around the foodstuff located there for steaming. The foodstuff here absorbs flavours of the vapour. The condensate arising during steaming in the top unit is conducted, after further permeation of the cooking material, in reverse direction back into the mixing vessel. The stock located in the mixing vessel is thus enriched in turn with flavours of the cooking material. The switched-on agitator effects an optimum blending of the moisture or the condensate fed back. In an advantageous development, it is provided that the vapours, after a first permeation of the cooking material, are conducted towards a substantially closed top unit cover to introduce the condensate. By means of this top unit cover, there is defined a cooking space. The vapour impinging on the cover condenses and drips from there back again into the top unit and into the mixing vessel.

BRIEF DESCRIPTION OF THE DRAWINGS

FIG. 4 shows a detailed representation of the top unit, in a side view.

FIG. 5 shows the front view of the top unit.

FIG. 6 shows the plan view of the top unit.

FIG. 7 shows the section according to the line VII—VII in FIG. 6.

FIG. 8 shows the section according to the line VIII—VIII in FIG. 6.

FIG. 9 shows a detailed representation of the cover in a side view.

FIG. 10 shows the front view of the cover.

FIG. 11 shows the cover in plan view.

FIG. 12 shows an under view of the cover.

FIG. 13 shows the section according to the line XIII—XIII in FIG. 11.

FIG. 14 shows the section according to the line XIV—XIV in FIG. 11.

FIG. 15 shows a partial enlargement of FIG. 1, showing the bearing region of the top unit on the inserted cover for the mixing vessel.

FIG. 16 shows a further partial enlargement, but relating to FIG. 2, to represent a sealing between the cover and the top unit.

FIG. 18 shows a further longitudinal sectional representation, in which the top unit is placed on the cover here serving as stand and arranged turned around.

FIG. 19 shows a representation corresponding to FIG. 18, but in a cross section.

FIG. 20 shows the plan view of an intermediate tray relating to a second embodiment.

FIG. 21 shows the section according to the line XXI—XXI in FIG. 20.

FIG. 22 shows the front view of the intermediate tray.

FIG. 23 shows a partial enlargement from FIG. 20.

FIG. 25 shows the front view of the cover.

FIG. 26 shows the section according to the line XXVI—XXVI in FIG. 24.

FIG. 27 shows the section according to the line XXVII—XXVII in FIG. 24.

FIG. 28 shows a representation corresponding to FIG. 17, in partial section, according to the second embodiment.

FIG. 29 shows a detail enlargement from FIG. 28.

FIG. 30 shows a plan view of the top unit with inserted intermediate tray according to FIG. 28, but with cover removed.

FIG. 31 shows a detail enlargement from FIG. 30.

DETAILED DESCRIPTION OF THE PREFERRED EMBODIMENTS

Figure 1:
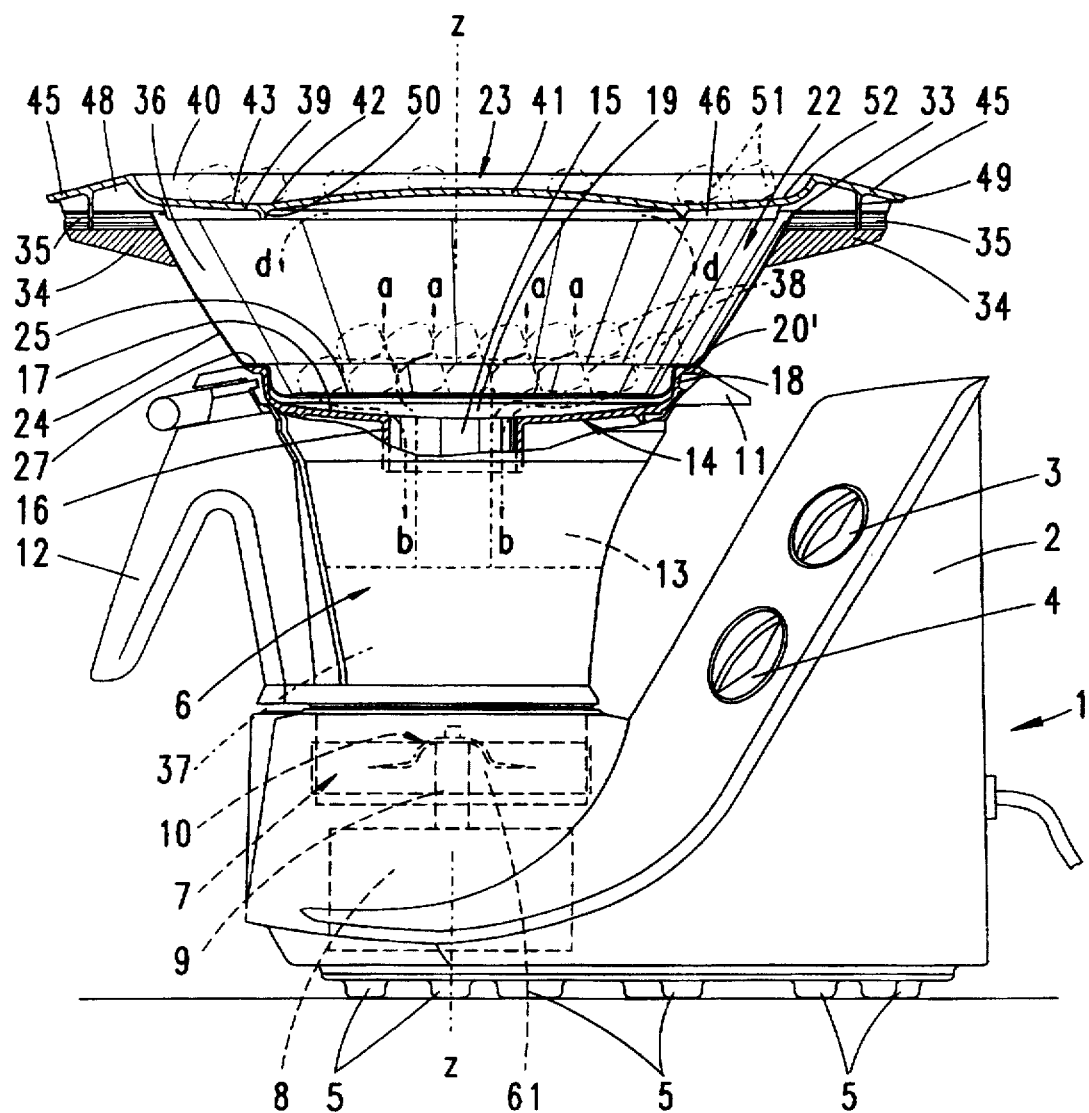
FIG. 1 shows a food processor according to the invention comprising a mixing vessel with a top unit of a first embodiment placed on top and closed by means of a cover, in a side view.
Figure 2:
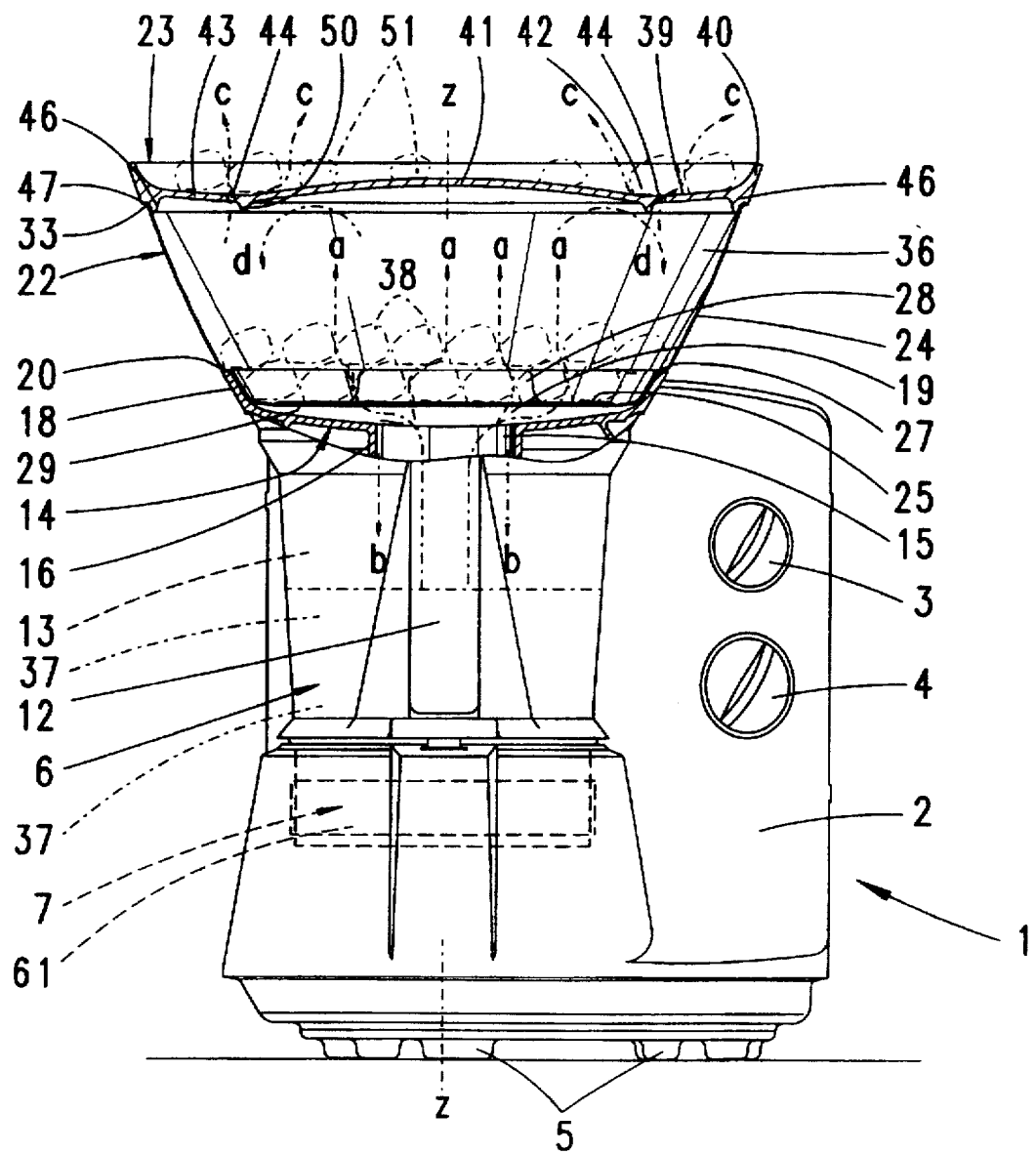
FIG. 2 shows the food processor according to FIG. 1, but in front view.
Figure 3:
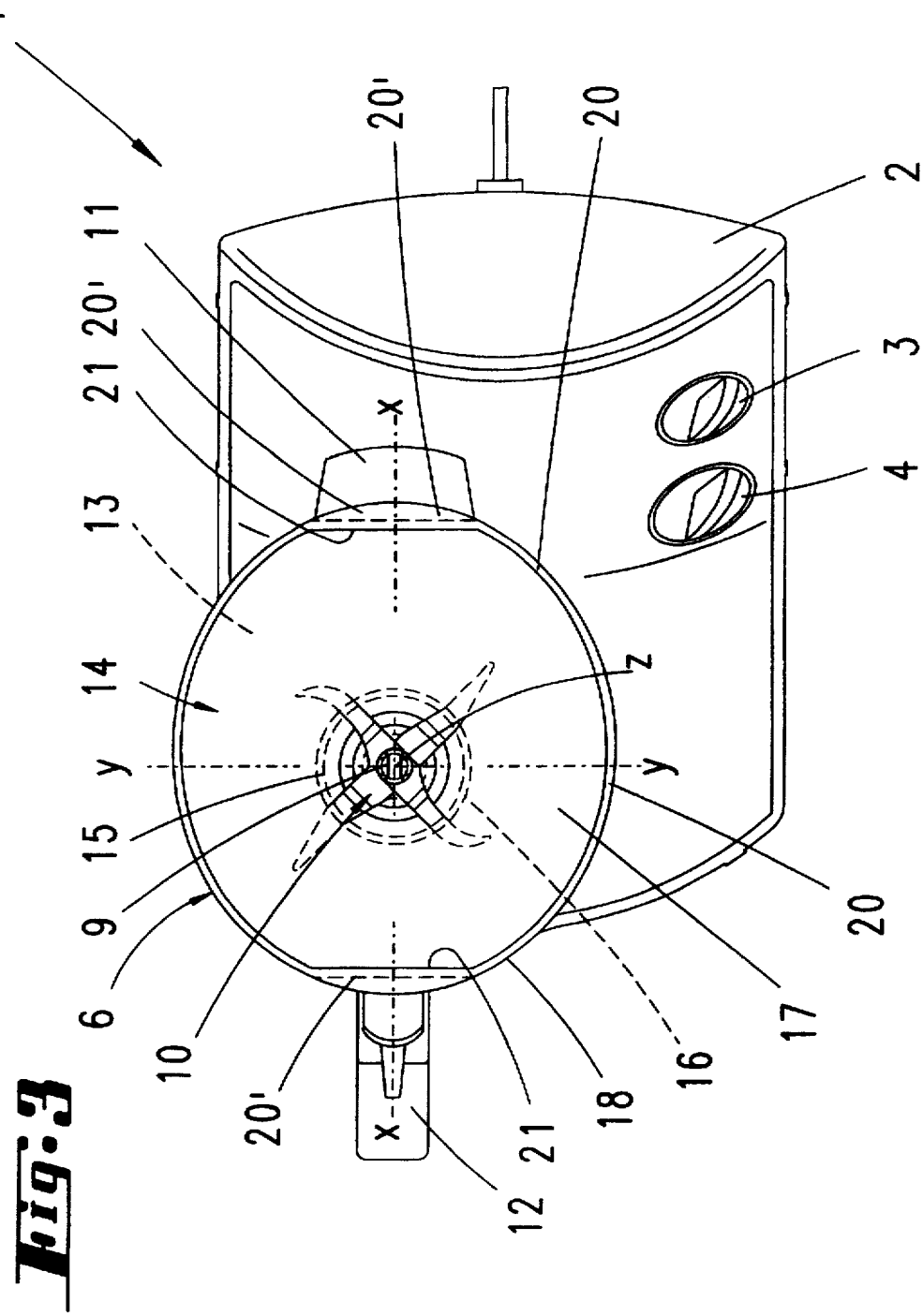
FIG. 3 shows a plan view of the food processor, but with top unit and cover removed, with a view onto an inserted cover for the mixing vessel.

The food processor 1 represented in FIGS. 1 to 3 has a housing 2, in which there are provided two rotary switches 3, 4. The housing 2 furthermore has supporting feet 5 on its underside.

To mount a mixing vessel 6 in the food processor 1, the food processor 1 is provided with a seat 7 not represented in further detail. A drive 8 provided in the housing 2, for example in the form of an electric motor, drives, by means of a drive shaft 9 aligned vertically, coaxially with a vertical axis z of the food processor 1, an agitator 10 disposed inside the mixing vessel 6 in the base region, which agitator 10, by means of a coupling arrangement, is in power-transmitting connection with the drive shaft 9. The agitator 10 is, in the embodiment shown, formed in known manner, in that blades bent at right angles, arranged offset by 90°, are mounted in rotationally-fixed manner by means of a screw connection on the shaft on the mixing pot side. The rotational speed of the agitator 10 is adjusted by means of the rotary switch 4.

The mixing vessel 6 is formed to be oval in its upper, open region, where in extension of the longitudinal axis x, there is provided a pouring spout 11 projecting beyond the edge of the mixing vessel 6. The spout 11 points, with mixing vessel 6 inserted in the housing 2, in the direction of the housing portion provided with the rotary switches 3, 4. At the end of the longitudinal axis x opposite the spout 11, the mixing vessel 6 is provided with a jug handle 12. This jug handle 12 extends over the entire height of the mixing vessel 6.

The stock space 13 defined in the mixing vessel 6 is covered by an inserted cover 14. This inserted cover 14 sits substantially positively and sealingly on the upper edge of the mixing vessel 6. The inserted cover 14 is formed to be funnel-shaped, a substantially centrally disposed large opening 15 being provided.

As is to be recognised from FIG. 1, the large opening 15 of the inserted cover 14 is arranged to be coaxial with the vertical axis z above the agitator 10. The wall 16 of the large opening 15 extends from a surface 17 of the inserted cover 14 down into the stock space 13.

The funnel shape of the inserted cover 14 is provided by the surface 17 rising towards the outside from the centrally located large opening 15, which is formed to be circular. At the outer edge, the surface 17 passes into a raised circumferential edge 18, the latter being inclined outwards towards its free end. By this means there results an upwardly widening seat space 19. The upwardly-directed surface of the circumferential edge 18 is referred to as cover edge 20.

As is recognisable in particular from FIG. 3, the projection of the inserted cover 14 has an oval shape.

On the longitudinal axis x there are formed, at the cover edge 20, on both sides of the transverse axis y, counter-register surfaces 21. These counter-register surfaces 21 extend perpendicular to the longitudinal axis x. These counter-register surfaces 21 are obtained by a pressing-in of the circumferential edge 18 in the two regions bisected by the longitudinal axis x, with retention of the cover edge 20 which, in this region, is consequently formed wider than in the regions between the counter-register surfaces 21. The width of the cover edge 20' formed here corresponds approximately to the height of the counter-register surface 21, by virtue of which there is provided a step-like arrangement.

On the inserted cover 14, there is disposed a top unit 22 covered by means of a cover 23, which top unit 22 and cover 23 are represented in a first embodiment in FIGS. 1 to 19 and are described below.

The top unit 22 has substantially a frusto-conical shape, the top unit wall 24 widening upwardly from an oval supporting surface 25. The ratio of longitudinal axis x to transverse axis y of the oval supporting surface 25 corresponds to that of the ratio of the inserted cover 14. In the embodiment shown, this is a ratio of approximately 1.2:1. The inclination of the top unit wall 24 corresponds to the inclination of the circumferential edge 18 of the inserted cover 14, here approximately 45°. The height of the top unit 22 is so chosen that it corresponds approximately to the radius on the longitudinal axis x of the supporting surface 25.

The top unit wall 24 has, in its lower region, a tapered top unit region 26, the height of the top unit region 26 corresponding to approximately one fifth of the total height of the top unit 22. By this means, there is formed a top unit shoulder 27, by means of which, with top unit 22 placed on the inserted cover 14, the top unit 22 is supported on the cover edge 20 of the inserted cover 14. The outer contour of the shoulder region 26 corresponds, in this connection, to the inner contour of the circumferential edge 18 of the inserted cover 14. In this top unit region 26, the top unit 22 is provided with register surfaces 28 on its longitudinal axis x. These register surfaces 28 extend, corresponding to the counter-register surfaces 21 of the inserted cover 14, perpendicular to the longitudinal axis x on both sides of the transverse axis y. Also these register surfaces 28 are formed by set-backs in the top unit wall 24. The height of the register surfaces 28, which are aligned perpendicular to the supporting surface 25, corresponds to the height of the top unit region 26, which in turn has a lesser height than that of the counter-register surfaces 21 of the inserted cover 14. By the set-back of the register surfaces 28, the top unit shoulder 27 is enlarged in this region, which top unit shoulder 27, with top unit 22 placed on the inserted cover 14, is supported on the widened cover edge region 20'.

Because of this arrangement of the register surfaces 28 and the counter-register surfaces 21 of the inserted cover 14 which correspond to them, there is provided, on the one hand, an orientation aid for the user in putting on the top unit 22 and, on the other hand, a protection against rotation of the top unit 22 on the inserted cover 14.

The top unit base 29 defining the supporting surface 25 is arranged to be raised compared with a circumferential supporting edge 30. The dimension of this rise corresponds approximately to the material thickness of the top unit wall 24 and that of the top unit base 29.

The top unit base 29 has perforations 31 arranged distributed over almost the entire supporting surface 25. Only in the central region 32 of the supporting surface 25 is the top unit base 29 formed closed, i.e. unperforated. This region 32 corresponds to approximately one quarter to one sixth of the entire supporting surface 25. The aforementioned perforations 31 are formed as longitudinal slits, whose width, in the embodiment shown, is approximately 1 to 1.5 mm and whose length is approximately 10 to 12 mm. The alignment of the perforations 31 is so chosen that they run in longitudinal extent parallel to the transverse axis y.

At the upwardly-directed end, the top unit wall 24 is provided with an outwardly-projecting, horizontally extending top unit edge 33.

On the longitudinal axis x, on both sides of the transverse axis y, there are provided handles 34 on the top unit wall 24. These handles 34 have, on their upper side, troughs 35 which are formed to be of circular-segmental shape in cross-section.

The space defined to be upwardly open by the top unit wall 24 and the top unit base 29 is referred to as cooking space 36.

A stock 37 located in the mixing vessel 6 releases, because of a 35 heating by means of a heater 61 adjustable by the rotary switch 3, flavoured vapours, which may emerge upwards out of the mixing vessel 6 through the large opening 15. After passing through the seat space 19, these vapours pass through the perforations 31 of the top unit base 29 and suffuse the cooking space 36. These flavoured vapours, which enter into the cooking space 36, are diagrammatically represented in FIGS. 1 and 2 by the arrow lines a. The foodstuffs, in particular cooking material 38, lying on the support 25 in the cooking space 36, are steamed by the flavoured vapours. Condensate produced by this and also moisture emerging from the cooking material 38 may be conducted, through the perforations 31 provided in the top unit base 29, back into the mixing vessel 6. After passage through the perforations 31, the condensate and moisture reach, by means of the funnel-shaped arrangement of the inserted cover 14, the region of the large opening 15 and from there the stock space 13 (arrow lines b). Because of the coaxial arrangement along the z axis of the large opening 15 in relation to the agitator 10, the condensate or the fed-back moisture passes into the direct influence of the agitator 10, by virtue of which the fed-back moistures mixed with the flavour of the cooking material 38 are immediately stirred in optimum manner into the stock 37. There is thus effected an exchange of flavours between the stock 37 and the cooking material 38, without these coming into direct contact with one another.

By the arrangement of a closed region 32 of the supporting surface 25, there is also provided the possibility of introducing fine-grained spices or the like into the cooking space 36. Since these would fall through the perforations 31 which are formed too large for this use, such small spices or the like are placed in the central, closed region 32. The spices are also here washed around by the flavoured vapours, by which the condensate forming is enriched with the spice flavours. As already described, the condensate passes back again into the mixing vessel 6 and is blended here with the stock 37.

This mode of operation is further supported by a use of the cover 23 already mentioned. By means of this cover 23, the cooking space 36 is covered.

As is to be seen in a plan view of the cover 23 in FIG. 11, the cover 23 has a like contour corresponding to the top unit 22 and the inserted cover 14. The projected surface is likewise formed to be oval, here also, as described before for the top unit 22, the ratio of longitudinal axis x to transverse axis y corresponding to the ratio of the axes for the inserted cover 14. The outer dimensions of the cover 23 in its lower region correspond to those of the top unit 22 in the region of its top unit edge 33.

The cover 23 comprises substantially a cover base 39, which passes at the edge into a circumferential edge 40. The circumferential edge 40 is, corresponding to the top unit wall 24 of the top unit 22, inclined outwardly. The cover 23 is by this means formed pan-like.

Furthermore, the cover 23 has an inner, upwardly-arched, lens-shaped central base region 41, which is a portion of the cover base 39. From the foot region 42 of the central base region 41, there extends a portion 43 of the cover base 39 rising up to the circumferential edge 40.

Disposed near the foot region 42, there are provided openings 44 in the rising portion 43. As is to be recognised from FIG. 11, these openings 44 are arranged on both sides of the longitudinal axis x, in each case over a partial region of the foot region 42. There is provided on both sides of the longitudinal axis x, in each case a row of openings 44, each row extending along the respective foot region portion. In relation to the entire circumference of the foot region 42, approximately one half of the foot region 42 is provided, in the embodiment shown, with the openings 44. These openings 44 are, both in longitudinal and in transverse extent, approximately twice as large as the perforations 31 of the top unit 22.

In the same manner as the top unit 22, the cover 23 is also provided, on both sides of its transverse axis y, in extension of the longitudinal axis x, with handles 45 arranged outside on the circumferential edge 40. These handles 45 are so formed that when the cover 23 is placed on the top unit 22, the handles 45 overlap those of the top unit 22.

The cover 23 also has, on the underside, a circumferential sealing projection 46, for sealing cooperation with the top unit edge 33 of the top unit 22. This sealing projection 46 extends, on both sides of the longitudinal axis x, along the circumferential edge 40, at a spacing from the latter, by which there is formed an underside cover bearing shoulder 47. In the regions of the handles 45, the sealing projection 46 passes into sealing shoulders 48 provided on the underside of the handles 45. These sealing shoulders 48 are provided along the outer edges of the handles 45, located on both sides of the longitudinal axis x.

The two sealing shoulders 48 of each one of the handles 45 are joined together by means of a circularly-segmentally shaped sealing strip 49, the latter being formed approximately centrally on the underside of the handle 45, in relation to the longitudinal axis direction. As is to be recognised in particular from the longitudinal section in FIG. 14, the sealing strips 49 project downwardly beyond the sealing projection 46.

In addition, the cover 23 has an oval drip projection 50 corresponding to its outer contour. The drip projection 50 is provided in the region of the foot region 32 of the top unit base, on its underside. The openings 44 already mentioned pass, outside the central region defined by the drip projection 50, through the cover base 39. The projected surface of the region defined by the drip projection 50 corresponds approximately to that of the projected surface of the inner, upwardly-arched, central base region 41.

On a placing of the cover 23 onto the top unit 22, there is produced a sealing covering of the cooking space 36. The cover bearing shoulder 47 of the cover 23 abuts against the top unit edge 33 and seals, in the handle-free regions, by means of the sealing projection 46 engaging against the inner surface of the top unit wall 24. In the region of the superpositioned handles 34 and 35, the sealing is effected by means of the sealing shoulders 48 and the sealing strips 49. The sealing shoulders 48 are supported on the upper sides of the handles 34, along their outer edges. Into the troughs 35 of the handles 34, there enter the correspondingly formed sealing strips 49. There is thus provided a circumferential seal for sealing cooperation of cover 23 and top unit 22.

Because of the now covered cooking space 36, a steaming of cooking material 38 placed into the cooking space 36 is optimised. The entering flavoured vapours cannot now escape uncontrolledly outwards. There is only possible a controlled exit through the openings 44 of the cover 23. By the small number of openings 44, there is provided a controlled passage of vapours. This passage may, however, still be used for the steaming of further foodstuffs 51, which are placed on the cover base 39 formed as a supporting surface 52 (see arrow lines c).

The vapours rising in the cooking space 36 deposit on the underside of the cover base 39, condense there, and run, because of the arched arrangement of the central base region 41 and the rising portions 43, in the direction of the drip projection 50 (see arrow lines d). Here there is effected a draining of the condensate back into the cooking space 36, directed towards of the region provided with the perforations 31, whence, as already described, the condensate is conducted into the mixing vessel 6. Also in the steaming of foodstuffs 51 disposed on the cover 23, condensate forming there or moisture forming there, may be conducted back through the openings 44. Here also there is effected a directed draining of the condensate in the direction of the region of the supporting surface 25 which is provided with the perforations 31. This is likewise facilitated by the arrangement of the raised central base region in combination with the rising portions 43. It is advantageous here for the openings 44 to be located in the transition region between the central base region 41 and the rising portion 43.

Figure 17:
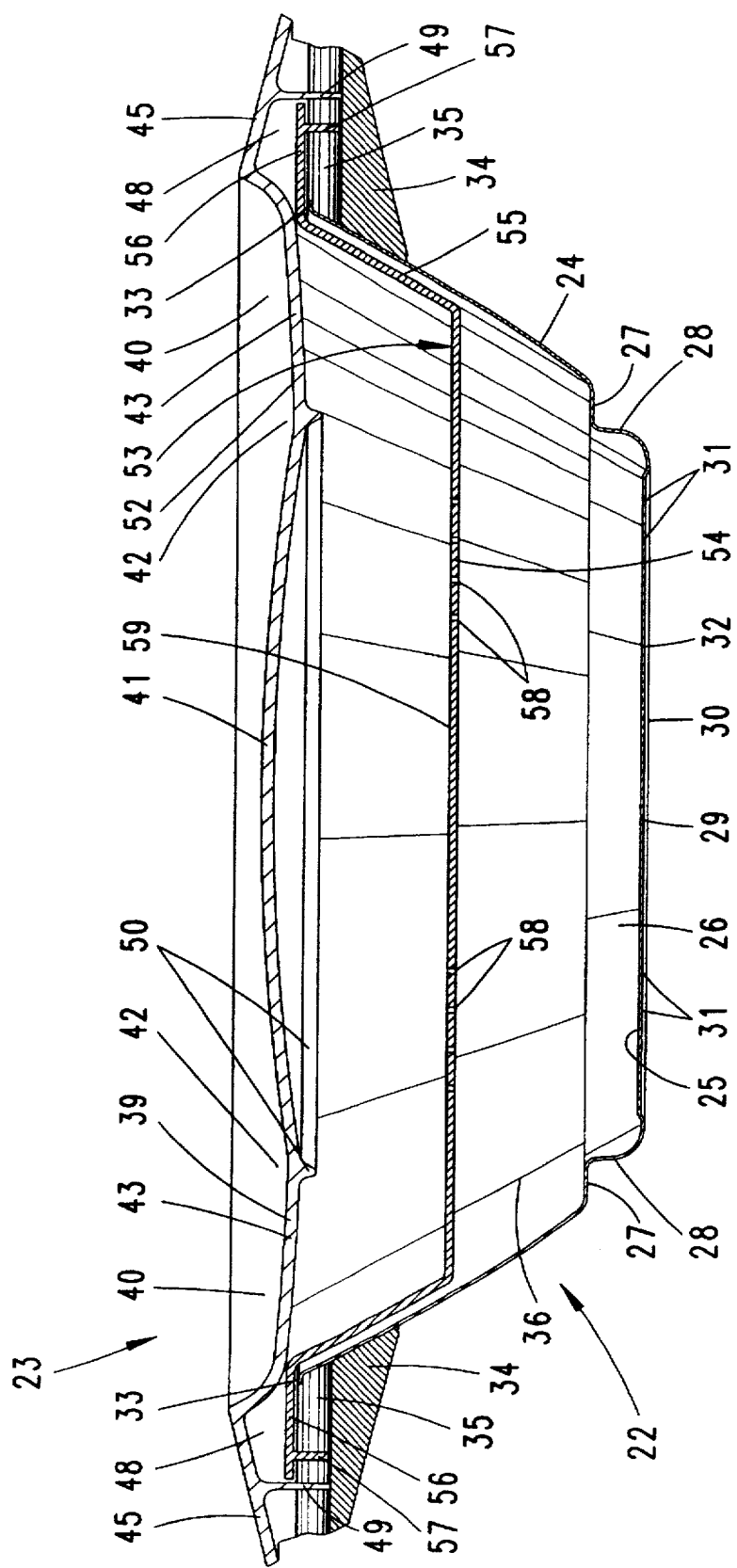
FIG. 17 shows a detailed representation of the top unit closed by means of the cover, with introduction of an intermediate tray, in a longitudinal sectional representation.
Figure 24:
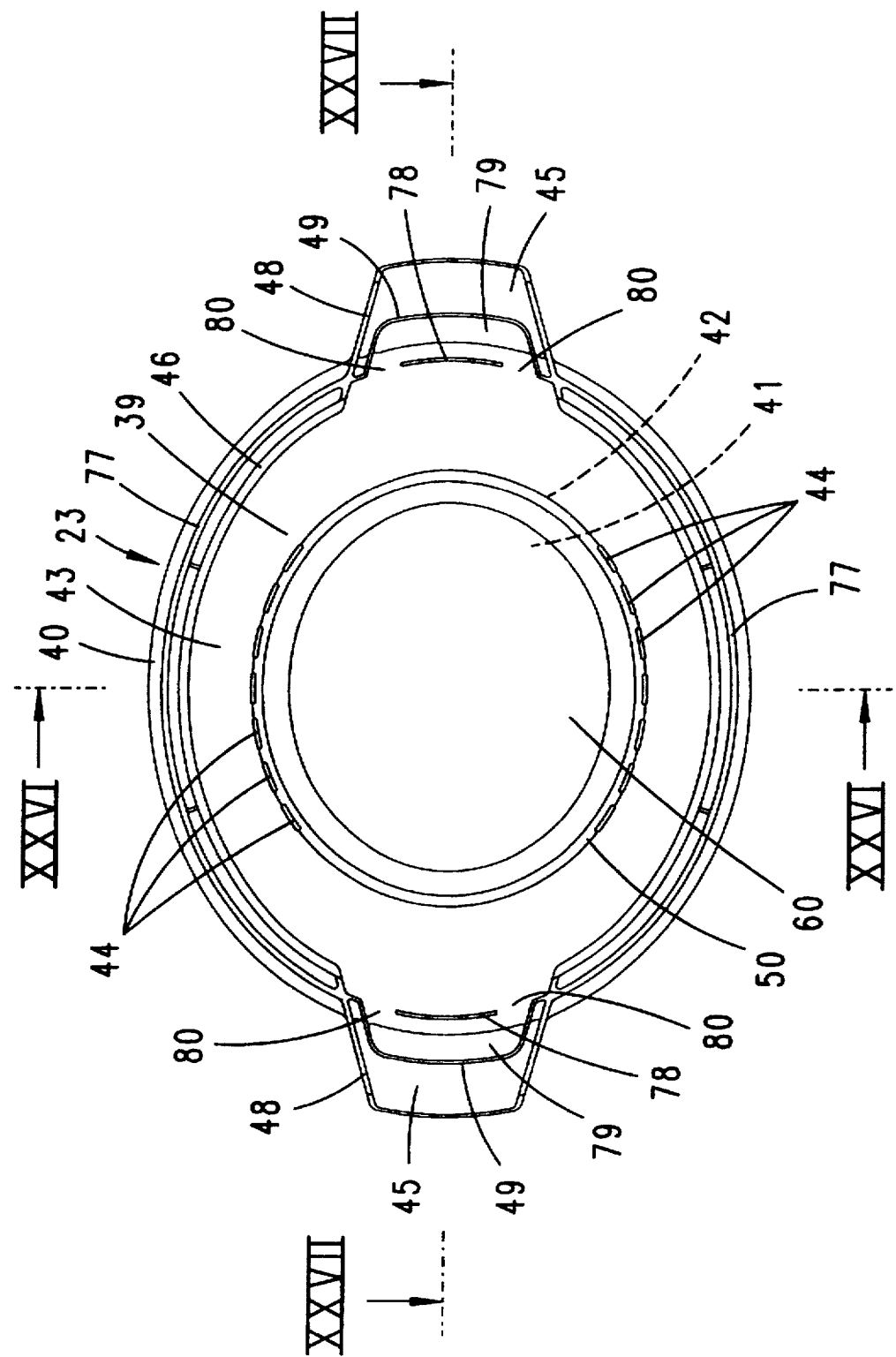
FIG. 24 shows an under view of the cover corresponding to FIG. 12, but relating to the second embodiment.
Figure 33:
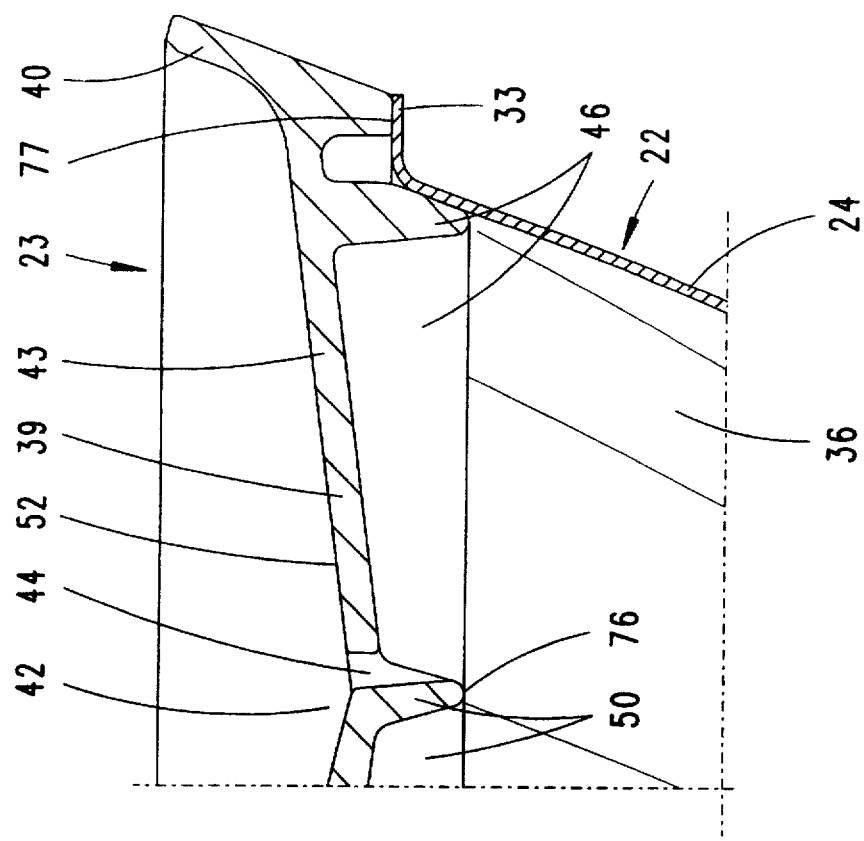
FIG. 33 shows a representation corresponding to FIG. 16, according to the second embodiment.
Figure 32:
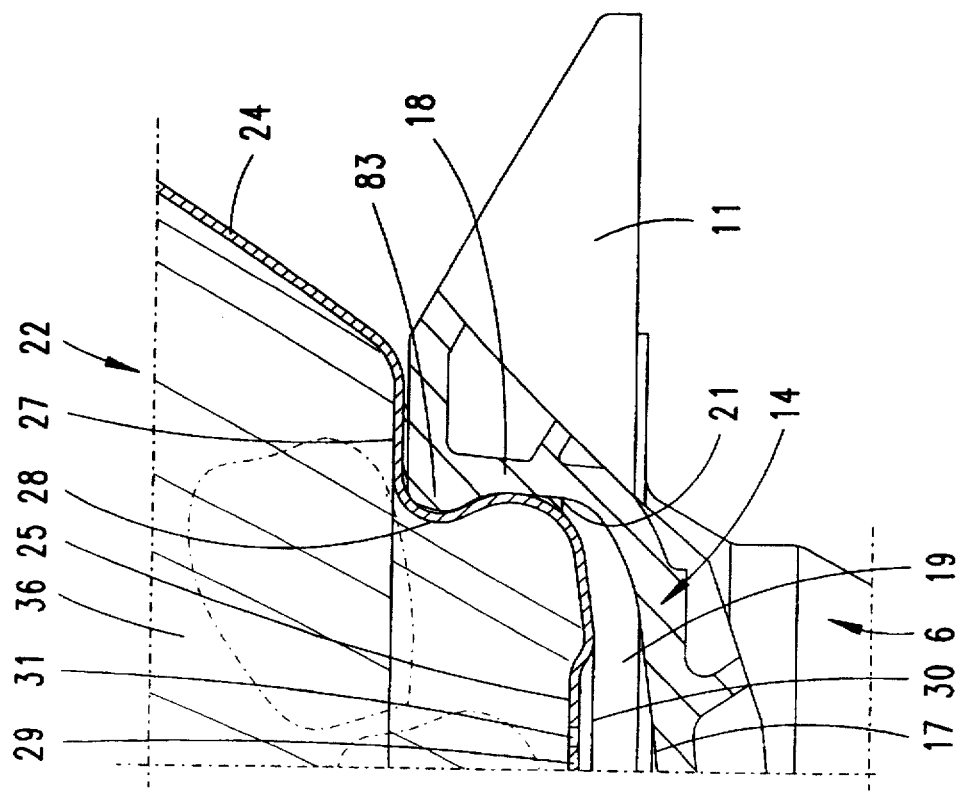
FIG. 32 shows a partial enlargement corresponding to FIG. 15, relating to the second embodiment.

As is evident from FIG. 17, there may be disposed, between the top unit 22 and the cover 23, an intermediate tray 53 in a first embodiment. This intermediate tray 53 has a form corresponding to the top unit 22, but has only about half the height of the top unit 22. From an intermediate tray base 54, there extends an upwardly-widening intermediate tray wall 55, whose inclination corresponds to that of the top unit 22. At the upper end, the intermediate tray wall 55 is provided with an outwardly-projecting annular collar 56. This annular collar 56 has supporting cross-members 57 on the underside, at the regions facing the handles 34 of the top unit 22 when in inserted condition, near the free ends.

The intermediate tray base 54 is provided, in similar manner to the top unit base 29, with perforations 58, to leave a central, closed region 59.

The intermediate tray 53 is located in such a way between the cover 23 and the top unit 22 that the edge of the intermediate tray 53 is contained within the circumferential sealing projection of the cover 23. The intermediate tray 53 is here supported, by means of the supporting cross-members 57, on the handles 34 of the top unit 22, namely in the region of the troughs 35. The annular collar 56 is here covered over by the handle 45 of the cover 23, the sealing strip 49 sealing, towards the outside, the seat space for the annular collar 56.

By this arrangement, there is facilitated simultaneous steaming of three layers of foodstuffs or the like. In addition to the two previously mentioned layers—top unit base 29 and cover base 39—there is formed a further layer, a third layer. The flavoured, rising vapours pass through the perforations 31 of the top unit base 29 as well as the perforations 58 of the intermediate tray base 54. Also with the use of an intermediate tray 53, there is provided the return of condensate or moisture forming. It is also conceivable, in this connection, for the base 54 of the intermediate tray 53 to be constructed to correspond to the cover base 39, in order to guarantee an improved return of condensate or the like.

The described cover 23 may also be used as stand for the top unit 22, for example in a placing of the top unit 22 onto a work surface. For this purpose, the cover 23 is placed in reversed form, i.e. with the original underside upwards, onto the work surface or the like. The annular drip projection now serves as holding projection for the top unit 22. The outer contour of the base region of the top unit 22 corresponds, in this connection, to the inner contour of the drip projection 50.

When the top unit 22 is placed in the described manner on the cover 23, the top unit 22 is supported by means of its supporting edge 30 on the original underside of the central base region 41, near the drip projection 50. A lateral displacement of the top unit 22 is prevented by the annular gripping of the base region by means of the drip projection 50. The hollow space now formed underneath the top unit base 29 by the bulge of the central base unit 41 is bounded by the annular drip projection 50 and forms a drip pan 60. In this, there may be collected moisture continuing to pass out of the top unit 22 through the top unit base 29.

Any condensate draining from the top unit edge 33 collects in the region between the annular drip projection 50 and the circumferential sealing projection 46, the rising portions 43 of the cover 23 preventing a run-off of this condensate through the perforations 44 of the cover 23, because the inclination of the portion 43 points in the direction of the circumferential sealing projection 46.

In FIGS. 20 to 23, there is represented a second embodiment of the intermediate tray 53, of the cover 23 and of the top unit 22.

The intermediate tray 53 comprises, substantially corresponding to the first embodiment, an intermediate tray base 54, from which there extends an upwardly-widening intermediate tray wall 55. The inclination of the intermediate tray wall 55 corresponds to that of the top unit 22.

In distinction from the first embodiment, the intermediate tray wall 55 is formed wave-shaped, where the wave crests 70 and the wave troughs 71 extend along the vertical extent of the inclined intermediate tray wall 55. As a result, there is produced a wave-shape-formed edge 72. As is to be recognised in particular from FIG. 20, the wave shape extends over the entire circumference of the edge 72, a wave height h corresponding approximately to the wall thickness d of the intermediate tray wall 55. Further, the wave shape is dimensioned in such a way that a wavelength 1 corresponds to approximately four to five times the wall thickness d (see FIG. 23 in this connection). In the embodiment shown, there is thus produced a uniform wave shape of the intermediate tray wall 55 and of the edge 72, there being provided, over the entire circumference 35 to 45, preferably 40 waves.

The intermediate tray base 54 is provided, corresponding to the first embodiment, with openings 58.

The intermediate tray base 54 is to be formed to be oval, corresponding to the top unit 22, the ratio of longitudinal axis x to transverse axis y corresponding to approximately 1.2:1. In the region of the longitudinal axis x, there is moulded onto the intermediate tray 53, on both sides, in each case a handle 73 formed in the shape of a U. The handles 73 are moulded on the inner side onto the intermediate tray wall 55 integrally as to material by means of their U-shaped arms 74. These U-shaped arms, extending from the intermediate tray wall 55, extend beyond the latter in vertical as well as in horizontal direction. At the end, the U-shaped arms 74 are joined by a U-shaped cross-member to form the handle 73.

In FIGS. 24 to 27, there is represented the top unit cover 23 in a second embodiment. This embodiment differs from that previously described substantially in that the openings 44 are partially let into the contour of the drip projection 50, this in such a way that the comb 76 of the drip projection 50 is unaffected even in the region of the openings 44. The arrangement is made here in such a way that the openings 44 are provided in the foot region of the central base region 41, but on the side of the drip projection 50 turned away from the central base region 41.

The cover 23 has likewise on the underside a circumferential sealing projection 46 for sealing cooperation with the top unit edge 33 of the top unit 22. This sealing projection 46 extends on both sides of the longitudinal axis x along the circumferential edge 40, at a spacing from the latter, a bearing rib 77 being formed in the region of the circumferential edge 40, rib 77 of the cover 23 being supported on the top unit edge 33. Corresponding to the first embodiment, the sealing projection 46 is continued in the region of the handles 45 in the form of edge-portion shaped sealing strips 49. In the region of each of the handles 45, there is provided, offset inwardly and spaced apart from the sealing strips 49, a seat-space closing wall 78, in order to form a seat space 79. Each seat-space closing wall 78 has two openings 80 for nesting of the handle 73 of the intermediate tray 53.

The assembled position of top unit 22, cover 23 and intermediate tray 53 is represented in FIGS. 28 to 31. The intermediate tray 53 is put into the top unit 22 in such a way that the handles 73 of the intermediate tray 43 are supported on the handles 34 of the top unit 22, this in the region of their U-shaped arms 74. The intermediate tray base 54 is, as is to be recognised from FIG. 28, located at approximately half the height of the top unit 22. Because of the wave-shaped arrangement of the intermediate tray wall 55, there are produced through-flow openings 81 in the region between the wave troughs 71 and the inner side of the top unit wall 24. Because of this, rising vapour may also pass by at the outer sides into the upper region of the top unit 22 and there flow around the cooking material located on the intermediate tray 53.

On a placing of the cover 23 on the top unit 22, there is produced a sealing covering of the cooking space 36. The cover 23 engages by means of its bearing rib 77 against the top unit edge 33 and seals, in the handle-free regions, by means of the sealing projection 46 abutting against the inner surface of the top unit wall 24. In the region of the superpositioned handles 34 and 45, there is effected a labyrinth-type sealing. The sealing strip 49 of the cover 23 engages, for this purpose, against the handle 34 of the top unit 22, where there is provided, on the upper side on the handle 34, a closing rib 82, for external placement at the sealing strip 49 in the assembled position (see FIG. 29). The seat-space closing wall 78, however, is supported on the top unit edge 33. The seat space 79 formed between the seat-space closing wall 78 and the sealing strip 49 is thus almost completely closed. The openings 80 of the seat-space closing wall 78 are, in this connection, almost completely filled by the cross section of the respective U-shaped arm 74 of the intermediate tray handle 73.

Because of this arrangement, rising hot vapours do not come directly against the surfaces of the intermediate tray handles 73. On the contrary, the rising vapours first come against the seat-space closing wall 78 and pass only in small quantities through the openings 80 into the seat space 79, in which lies the U-shaped cross-member 75 of the intermediate tray handle 73. Accordingly, the handles of the cover 23 are not greatly heated.

Further, there are gripped by this arrangement, because of their U-shaped arrangement, the handles 73 of the intermediate tray 53.

The undersides of the top unit handles 34 are profiled in order to prevent a slipping off on a lifting off of the top unit 22.

The register surfaces 28 of the top unit 22 shown in the second embodiment are formed as trough-like undercuts. These undercuts cooperate with a nose-like register projection 83 formed as counter-register surface 21 in the region of the inserted cover 14. The projection 83 is formed on the inside of the circumferential edge 18 in the region of the spout 11. The top unit 22 is placed in the manner of a lever movement onto the inserted cover 14, the nose-like register projection 83 entering into the trough-like undercut of the register surface 28. This arrangement is intended to prevent an unintentional lifting of the top unit 22 from the inserted cover 14.

We claim:

1. A food processor comprising a mixing vessel being heatable in a lower region thereof, an agitator in the mixing vessel, a drive for the agitator, a top unit supported at an upper region of the mixing vessel opposite said lower region of the mixing vessel, said top unit comprising a cooking material support in a base of the top unit and having perforations in the base for preparation by steaming of foodstuffs, the perforations being formed in a cooking material support for receiving condensate/moisture to be conducted back into the mixing vessel, and wherein the food processor further comprises a vessel cover sitting on an upper edge of said vessel and extending beneath said top unit and into said vessel.

2. A food processor according to claim 1, wherein the top unit base has a central, unperforated region.

3. A food processor according to claim 1, wherein there is disposed, between the top unit and the mixing vessel, an inserted cover which has a substantially central large opening.

4. A food processor comprising a mixing vessel being heatable in a lower region thereof, an agitator in the mixing vessel, a drive for the agitator, a top unit supported at an upper region of the mixing vessel opposite said lower region of the mixing vessel, said top unit comprising a cooking material support in a base of the top unit and having perforations in the base for preparation by steaming of foodstuffs, the perforations being formed in a cooking material support for receiving condensate/moisture to be conducted back into the mixing vessel, wherein the top unit is covered by a top cover, the top cover having openings, and a supporting surface for cooking material.

5. A food processor according to claim 4, wherein the top cover has an inner, upwardly-arched central base region.

6. A food processor according to claim 5, wherein the openings of the top cover are associated with a foot region of the central base region of the top cover.

7. A food processor according to claim 6, wherein the top cover has, circumferentially at its edge, extending from the foot region, a rising portion which passes into a raised circumferential edge.

8. A food processor according to claim 4, wherein the top cover has, on the underside, a circumferential sealing projection, for sealing cooperation with an upper edge of the top unit.

9. A food processor according to claim 8, wherein the top cover, on the underside thereof, defines an inner drip edge spaced apart from the sealing projection and being in the form of a circumferential rib.

10. A food processor according to claim 9, wherein the openings of the top cover are partially let into a contour of the rib.

11. A food processor according to claim 9, wherein the top cover has a drip edge comb which is unaffected even in a region of the openings of the top cover.

12. A food processor according to claim 4, further comprising an intermediate tray located between the top unit and the top cover.

13. A food processor according to claim 12, wherein an edge of the intermediate tray is located within a circumferential sealing projection of the top cover.

14. A food processor according to claim 12, wherein the intermediate tray leaves through-flow openings with respect to an inner surface of the top unit.

15. A food processor according to claim 12, wherein the intermediate tray has a wave-shaped edge which is formed to be wave-shaped in such a way that the wave crests and wave troughs extend substantially vertically.

16. A food processor according to claim 15, wherein a wave height (h) corresponds to approximately a wall thickness (d) and a wavelength (1) corresponds to approximately four to five times the wall thickness (d) of a wall of the intermediate tray.

17. A food processor according to claim 13, wherein a partial portion of the sealing projection is formed as a sealing strip and the top cover has, offset inwardly and spaced apart from the sealing strip, a seat-space closing wall, which has openings for nesting of a handle of the intermediate tray.

18. A food processor according to claim 17, wherein there is provided, on a handle of the top unit, closing rib for external placement at the sealing strip.

19. A food processor comprising a mixing vessel being heatable in a lower region thereof, an agitator in the mixing vessel, a drive for the agitator, a top unit supported at an upper region of the mixing vessel opposite said lower region of the mixing vessel, said top unit comprising a cooking material support in a base of the top unit and having perforations in the base for preparation by steaming of foodstuffs, the perforations being formed in a cooking material support for receiving condensate/moisture to be conducted back into the mixing vessel, wherein there is disposed, between the top unit and the mixing vessel, an inserted cover which has a substantially central large opening, and the top unit defines register surfaces which cooperate with corresponding counter-register surfaces on the inserted cover.

20. A food processor according to claim 19, wherein an individual one of said register surfaces has a step-like form.

21. A food processor according to claim 19, wherein an individual one of said register surfaces extends perpendicular to a main axis (x) of the top unit.

22. A food processor according to claim 19, wherein the register surfaces on the top unit have a form of trough-like undercuts.

23. A food processor according to claim 19, wherein at least one of said counter-register surfaces of said inserted cover has a form of a nose-like register projection.

24. A method for preparation of foodstuffs in a food processor comprising a mixing vessel being heatable in a lower region thereof, an agitator in the mixing vessel, a drive for the agitator, a top unit supported at an upper region of the mixing vessel opposite said lower region of the mixing vessel, said top unit comprising a cooking material support in a base of the top unit and having perforations in the base for preparation by steaming of foodstuffs, the perforations being formed in a cooking material support for receiving condensate/moisture to be conducted back into the mixing vessel, wherein the food processor further comprises a heater located at a bottom of the vessel to cook the food, the steaming of the foodstuffs producing vapour, the method comprising steps of conducting vapours rising out of the mixing vessel into said top unit to flow around cooking material accommodated in the top unit vessel, allowing the vapours to condense to a condensate, and conducting the condensate, after further permeation of the cooking material, in reverse direction back into the mixing vessel.

25. A method as claimed in claim 24, wherein the vapours, after a first permeation of the cooking material, are conducted towards a substantially closed top cover of the top unit for introduction of the condensate.

26. A food processor according to claim 1, wherein said vessel cover has a portion which extends into said vessel, said cover portion having an opening communicating with said vessel.

* * * * *